United States Patent
Painter et al.

(10) Patent No.: US 10,878,497 B2
(45) Date of Patent: Dec. 29, 2020

(54) SYSTEM AND METHOD FOR LOW FRICTION OPERATOR INTERFACE ON A MOBILE DEVICE

(71) Applicant: FAIR IP, LLC, Santa Monica, CA (US)

(72) Inventors: Scott Edward Painter, Los Angeles, CA (US); David Luan Nguyen, Playa Vista, CA (US); Serge Madenian, Northridge, CA (US); Ryan James Naughton, Santa Monica, CA (US); Gilad Ashpis, Playa del Rey, CA (US)

(73) Assignee: FAIR IP, LLC, Santa Monica, CA (US)

( * ) Notice: Subject to any disclaimer, the term of this patent is extended or adjusted under 35 U.S.C. 154(b) by 319 days.

(21) Appl. No.: 15/873,452

(22) Filed: Jan. 17, 2018

(65) Prior Publication Data
US 2018/0204279 A1    Jul. 19, 2018

Related U.S. Application Data

(60) Provisional application No. 62/596,007, filed on Dec. 7, 2017, provisional application No. 62/447,353, filed on Jan. 17, 2017, provisional application No. 62/447,349, filed on Jan. 17, 2017.

(51) Int. Cl.
*G06Q 40/00* (2012.01)
*G06Q 40/02* (2012.01)
*G06F 16/23* (2019.01)
*G06F 16/16* (2019.01)

(52) U.S. Cl.
CPC .......... *G06Q 40/025* (2013.01); *G06F 16/23* (2019.01); *G06F 16/168* (2019.01)

(58) Field of Classification Search
USPC ......................................................... 705/38
See application file for complete search history.

(56) References Cited

U.S. PATENT DOCUMENTS

| | | | |
|---|---|---|---|
| 7,555,443 B2 | 6/2009 | Chandran et al. |
| 7,797,166 B1 | 9/2010 | Bradley |
| 8,209,247 B2 | 6/2012 | Krautter |
| 8,438,048 B1 | 5/2013 | Benavides, III |
| 8,660,943 B1 | 2/2014 | Chirehdast |

(Continued)

OTHER PUBLICATIONS

Office Action issued for U.S. Appl. No. 15/873,498, dated Sep. 3, 2019, 20 pages.

(Continued)

*Primary Examiner* — William E Rankins
(74) *Attorney, Agent, or Firm* — Sprinkle IP Law Group

(57) ABSTRACT

A computer system that provides a low friction operator interface on a mobile device is disclosed. The computer system can comprise a mobile device processor and a mobile application. The mobile application is executable to present a graphical user interface at the mobile device, the graphical user interface comprising series of application pages having inputs for a limited set of user record information; receive the limited set of user record information via the user interface; enhance the limited set of user record information with personally identifiable information extracted from an image and send the enhanced set of user record information to a server for processing.

22 Claims, 17 Drawing Sheets

(56) References Cited

U.S. PATENT DOCUMENTS

| | | | |
|---|---|---|---|
| 8,712,909 | B1 | 4/2014 | Raubenheimer et al. |
| 9,147,216 | B2 | 9/2015 | Seergy et al. |
| 9,501,772 | B2 | 11/2016 | Sarkissian et al. |
| 9,785,793 | B2 | 10/2017 | Lacey |
| 10,453,128 | B2 * | 10/2019 | Garrity ............... G06Q 40/025 |
| 1,072,647 | A1 | 7/2020 | Painter et al. |
| 2002/0029154 | A1 * | 3/2002 | Majoor ................. G06N 5/022 |
| | | | 706/47 |
| 2003/0139990 | A1 | 7/2003 | Greco |
| 2003/0225729 | A1 * | 12/2003 | Maloche ............. G06Q 20/102 |
| 2006/0265258 | A1 | 11/2006 | Powell et al. |
| 2006/0277139 | A1 | 12/2006 | Poltorak |
| 2007/0022020 | A1 | 1/2007 | Bernstein |
| 2007/0094125 | A1 | 4/2007 | Izyayev |
| 2007/0192872 | A1 | 8/2007 | Rhoads |
| 2007/0267490 | A1 * | 11/2007 | Jerabeck .............. G07G 1/0018 |
| | | | 235/383 |
| 2007/0267501 | A1 * | 11/2007 | Jovanovski ........ G06K 7/10722 |
| | | | 235/472.01 |
| 2008/0098292 | A1 * | 4/2008 | Embry ................. G06F 40/174 |
| | | | 715/226 |
| 2009/0157522 | A1 | 6/2009 | Srinivasan et al. |
| 2009/0299911 | A1 * | 12/2009 | Abrahams .............. G06Q 40/00 |
| | | | 705/36 R |
| 2010/0094740 | A1 | 4/2010 | Richter |
| 2010/0274571 | A1 | 10/2010 | McFall et al. |
| 2010/0293181 | A1 | 11/2010 | Muller |
| 2011/0053559 | A1 * | 3/2011 | Klein ..................... G07C 13/00 |
| | | | 455/411 |
| 2012/0005070 | A1 | 1/2012 | McFall |
| 2012/0265648 | A1 | 10/2012 | Jerome |
| 2013/0006916 | A1 | 1/2013 | McBride et al. |
| 2013/0120595 | A1 | 5/2013 | Roach |
| 2014/0172687 | A1 | 6/2014 | Chirehdast |
| 2014/0229363 | A1 | 8/2014 | Orloff et al. |
| 2014/0279533 | A1 | 9/2014 | Hamilton et al. |
| 2014/0297530 | A1 * | 10/2014 | Eckel ................. G06Q 20/4014 |
| | | | 705/44 |
| 2014/0351129 | A1 | 11/2014 | Finot |
| 2015/0026035 | A1 | 1/2015 | Showalter |
| 2015/0120489 | A1 | 4/2015 | Edelman |
| 2015/0215305 | A1 * | 7/2015 | Wetzel ................ H04L 63/0807 |
| | | | 726/9 |
| 2015/0235310 | A1 | 8/2015 | Rozman et al. |
| 2015/0248393 | A1 * | 9/2015 | Watanabe ............. G06F 40/174 |
| | | | 715/226 |
| 2015/0293915 | A1 * | 10/2015 | Garg ................... G06F 16/5838 |
| | | | 382/182 |
| 2015/0319170 | A1 * | 11/2015 | Grossemy ............... G06F 21/31 |
| | | | 713/186 |
| 2015/0339769 | A1 * | 11/2015 | deOliveira ........... G06Q 40/025 |
| | | | 705/38 |
| 2016/0042081 | A1 | 2/2016 | Baker |
| 2016/0125528 | A1 | 5/2016 | Brown |
| 2016/0166180 | A1 | 6/2016 | Isaacson et al. |
| 2016/0171603 | A1 * | 6/2016 | Amtrup .............. H04N 1/00251 |
| | | | 705/38 |
| 2016/0232546 | A1 | 8/2016 | Ranft et al. |
| 2016/0321726 | A1 | 11/2016 | Singh et al. |
| 2016/0360403 | A1 | 12/2016 | Jordi et al. |
| 2017/0357941 | A1 * | 12/2017 | Best ................. G06Q 20/40145 |
| 2018/0204173 | A1 | 7/2018 | Painter et al. |
| 2018/0204253 | A1 | 7/2018 | Painter et al. |
| 2018/0204280 | A1 | 7/2018 | Painter et al. |
| 2018/0204281 | A1 | 7/2018 | Painter et al. |
| 2018/0204282 | A1 | 7/2018 | Painter et al. |
| 2019/0172001 | A1 | 6/2019 | Painter et al. |

OTHER PUBLICATIONS

International Search Report and Written Opinion for International Application No. PCT/US2018/14078, dated Mar. 9, 2018, 13 pages.

International Search Report and Written Opinion for International Application No. PCT/US2018/14080, dated Mar. 9, 2018, 11 pages.

International Search Report and Written Opinion for International Application No. PCT/US2018/14076, dated Mar. 9, 2018, 9 pages.

International Search Report and Written Opinion for International Application No. PCT/US18/14073, dated Mar. 20, 2018, 9 pages.

International Search Report and Written Opinion for International Application No. PCT/US18/14082, dated Apr. 4, 2018, 8 pages.

International Search Report and Written Opinion for International Application No. PCT/US18/14081, dated Apr. 9, 2018, 15 pages.

Office Action for U.S. Appl. No. 15/873,678, dated Jan. 23, 2020, 22 pgs.

Office Action for U.S. Appl. No. 15/873,697, dated Jan. 31, 2020, 16 pgs.

Office Action for U.S. Appl. No. 15/873,536, dated Feb. 5, 2020, 24 pgs.

Office Action for U.S. Appl. No. 15/873,518, dated Apr. 27, 2020, 10 pgs.

Office Action for U.S. Appl. No. 15/873,498, dated Apr. 29, 2020, 21 pgs.

Office Action for U.S. Appl. No. 15/873,678, dated May 19, 2020, 9 pgs.

Patents; Patent Application titled "Dealers Electronic Exchange," Journal of Transportation, Atlanta, Jan. 17, 2015, 434, 9 pgs. retrieved at <<https://dialog.proquest.com/professional/docview/1642730426/1718AA586063A5BE056/6?accountid-131444>>.

Office Action for U.S. Appl. No. 15/873,536 dated Jul. 21, 2020, 29 pgs.

* cited by examiner

Is This You?

First Name: John ✓
Last Name: Smith ✓

License No
F25592150094

Date of Birth: 07/23/1939 ✓
Exp Date: 04/25/2020 ✓

Looks Good

FIG. 4E

Confirm or Edit Your Current Address

Address Line 1
123 Main Street ✓

Address Line 2

City: Metropolis
State: CA ✓
Zip: 07777 ✓

Fair is currently only operating in Southern California. In order to join Fair at this time, you must enter a California address.

Next

FIG. 4D

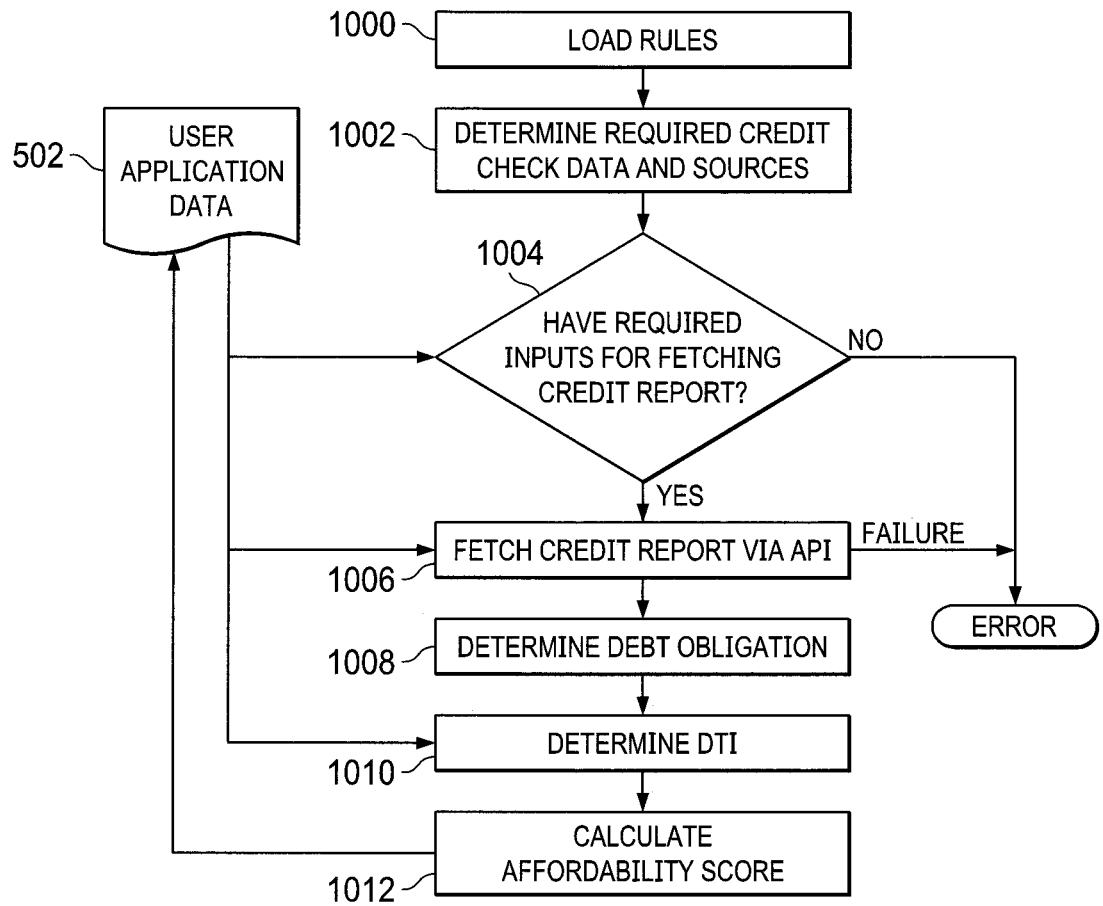

```
debt_obligations = 0.0
beginning_date = datetime.today() - timedelta(days=365)
for tradeline in open_credit_tradelines_with_history
    payments = [ ]
    for monthly_snapshot in tradeline['accountHistory']:
        if monthly_snapshot['historyAvailable'] == 'available' and \
        datetime.strptime(monthly_snapshot['monthEffective'],"%Y-%m") > beginning_date and \
            int(monthly_snapshot['currentBalance']) != 0:
            payments.append(int(monthly_snapshot['scheduledMonthlyPayment']))
    if payments != [ ]:
        debt_obligations = debt_obligations + sum(payments)/len(payments)
monthly_debt_obligations = debt_obligations
```

SYSTEM AND METHOD FOR LOW FRICTION OPERATOR INTERFACE ON A MOBILE DEVICE

RELATED APPLICATIONS

This application claims priority under 35 U.S.C. § 119(e) to U.S. Provisional Application No. 62/596,007, entitled "Data Processing System and Method for Managing Location Independent Transactions," filed Dec. 7, 2017, U.S. Provisional Application No. 62/447,353, entitled "System and Method For Low Friction Mobile Device User Interface," filed Jan. 17, 2017 and U.S. Provisional Application No. 62/447,349, entitled "Networked Vehicle Data System," filed Jan. 17, 2017, each of which is fully incorporated herein by reference for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

The present disclosure relates generally to operator interfaces for collecting data from users. More particularly, embodiments relate to providing a low friction operator interface on a mobile device.

BACKGROUND

Online forms often have numerous fields. For example, online loan applications often have many fields for the input of personally identifiable information that the loan provider can use for determining credit worthiness and the loan amount/terms. Consequently, such forms are typically browser-based forms designed for desktop and laptop computers. However, it is becoming increasingly common for people to use their mobile phones and other compact mobile devices as their primary computing devices for interacting with the Internet. While smart phones and other mobile devices support browsers, it is a tedious and error prone process to fill out the forms on a smart phone screen. Moreover, many online processes require multiple sessions. For example, because of the significant amount of time it takes to approve conventional loans, the approval process does not occur in the context of a single session and, instead, requires the user to log into the loan provider's web site multiple times.

Part of the delay introduced by financing stems from the methods by which conventional loans are approved. First, loan applicants must often provide copies of paper documents such as pay stubs or tax documents to verify income. This may require communicating with the loan provider through additional channels (e.g., regular mail, email). But, even if the user can upload the documents to the loan providers web site, this process is cumbersome, often requiring that consumer locate and scan paper documents. Moreover, such income verification documents are often manually reviewed by the loan provider.

Furthermore, loan providers typically use a loan-to-value ratio (LTV) (ratio of the loan to the value of the asset purchased) to approve loans for illiquid assets (or other assets that can be used as security). Generally, the value of the asset must be sufficient to secure the entire loan even if the purchase includes items that cannot be secured (e.g., service contracts). As such, the loan approval process requires that a consumer know, prior to applying for financing, the value of the asset being purchased, its price, and their down payment or cap cost reduction. Consequently, financing often does not happen until a consumer and seller agree on a price and down payment/cap cost reduction for an asset (e.g., a consumer and dealer agree on a price for a specific car). Thus, even if a user applies online for financing prior to going to the dealership, the user must log back in or otherwise contact his/her financial institution to complete the loan once the user and dealer have agreed on a price. Conventional methods of online financing are thus inefficient, requiring multiple sessions.

SUMMARY

One embodiment provides a computer system that provides a low friction operator interface. The computer system can comprise a mobile device processor and a mobile application. The mobile application can be executable to present a graphical user interface in a display of the mobile device, the graphical user interface comprising series of application pages having inputs for a limited set of user record information; receive the limited set of user record information from a user via the user interface, the limited set of user record information comprising an image of a government issued identification document; enhance the limited set of user record information with personally identifiable information extracted from the image of the government identification document to create an enhanced set of user record information; and send a set of application data to a server computer for processing, the set of application data comprising the enhanced set of user record information.

The mobile application may be further executable to pre-fill a plurality of editable fields in the user interface with the personally identifiable information extracted from the image to allow the user to confirm the personally identifiable information extracted from the image. A user can confirm the accuracy of the pre-filled information. The mobile application can receive a user input based on a user interaction with the graphical user interface confirming the personally identifiable information in the editable fields. According to one embodiment, the mobile application enhances the limited set of user record information with personally identifiable information extracted from the image based responsive to the user input confirming the personally identifiable information in the editable fields.

The mobile application may comprise an interface for a remote identification verification service and be executable to connect to the remote identification verification service and provide the image to the remote identification verification service. The mobile application can receive an identification verification signal from the remote identification verification service responsive to the image and based on the identification verification signal indicating the government issued identification document is authentic, continue an application approval process to enhance the limited set of user record information. If the identification verification signal indicates that the identification could not be verified, the mobile application can take a configured action.

The mobile application may comprise an interface for a data extraction service and be executable to connect to the data extraction service, provide the image of the government issued identification to the third party data extraction service and receive the personally identifiable information extracted from the image of the government issued identification document from the data extraction service.

Based on a decision response indicating denial of the user application, the mobile application can present an application page requesting additional user information and, responsive to receiving the additional user information, generate a request to approve the user application, the user application comprising the additional user information. Based on a decision response indicating approval of the user application, the mobile application can present an application page indicating approval of the user application.

The computer system may further comprise a server computer. The server computer can be coupled to a data store storing approval rules. The server computer may comprise a server computer processor and a server data application. The server data application executable to process the user application according to the approval rules to approve or deny the user application.

According to one embodiment, the server data application can be executable to connect to a plurality of remote information provider systems to retrieve a set of information provider data referenced by the approval rules using personally identifiable information from the enhanced set of user record information. According to one embodiment, the server computer may comprise a set of application program interfaces (APIs) specifically configured for the plurality of remote information provider systems. The data application can retrieve the set of information provider data using the APIs.

The server data application may further determine if the user application is approved based on the approval rules and the set of information provider data. Based on a determination that the user application is not approved, the server data application can send a decision response to the mobile application indicating denial of the user application. Based on a determination the user application is approved, the server data application can send a decision response to the mobile application indicating approval of the user application and an affordability score. The approval rules, according to one embodiment, comprise fraud detection rules, identity verification rules.

According to one embodiment, the approval rules comprise a credit check rule referencing data from a credit report from a crediting reporting service. The server data application is executable to connect to the credit reporting service, retrieve the credit report for the user using the enhanced set of user record information and determine if the application passes the credit check based on applying the credit check rule to the retrieved credit report.

The approval rules may comprise an identity verification rule referencing data from a remote identity verification service. The server data application can be executable to connect to the remote identity verification service, retrieve identity verification data for the user using the enhanced set of user record information and determine if the application passes the identity verification rule based on applying the identity verification rule to the retrieved identity verification data.

According to one embodiment, the data store may store a maximum debt-to-income ratio (DTI) and maximum payment-to-income ratio (PTI) and the approval rules can comprise an affordability rule that reference a credit report from a credit reporting service. The server data application can be further executable to connect to the credit reporting service and perform a soft pull retrieve the credit report for the user using personally identifiable information from the enhanced set of user record information. The server data application can analyze the trade lines in the credit report to determine a monthly debt obligation. Further, the server data application can determine a current DTI for the user from a user income and the monthly debt obligation. In one embodiment, the user income can be a verified income for the user. The server data application can further determine the affordability score for the user, the affordability score for the user comprising a monthly payment that does not exceed the maximum PTI and when added to a specified income for the user, does not exceed the maximum DTI. The server may further store a maximum payment limit. The affordability score may be limited by the maximum payment limit.

The server data application may be further executable to determine the verified income using at least two different income measures selected from a projected income determined based on financial transactions in a financial account of the user, a self-reported income and an estimated income.

According to one embodiment, the approval rules further comprise an income verification rule to verify a user's income, the income verification rule referencing a self-reported income collected in the limited set of user record information and an estimated income from an income estimation service. The server data application can connect to the income estimation service and retrieve the estimated income for the user from the income estimation service using personally identifiable information from the enhanced set of user record information and determine a verified income from the estimated income and self-reported income based on the income verification rule.

The computer system may comprise an income prediction model stored in the data store. The income prediction model may reference an estimated income from an income estimation service and a projected income determined based on financial transactions in a financial account of the user. The server data application can connect to the income estimation service, retrieve the estimated income for the user from the income estimation service using personally identifiable information from the enhanced set of user record information, retrieve the projected income for the user based on financial transactions in the financial account of the user using credentials provided by the user to the mobile application. The server data application can determine the predicted income based on the income prediction model and using the projected income and the estimated income.

According to one embodiment, an approval rule can comprise an income verification rule that references a predicted income from the income prediction model and a self-reported income. The server data application may determine a verified income according to the income verification rule using the predicted income determined from the income prediction model and the self-reported income.

In another embodiment, an approval rule can comprise an income verification rule that references a predicted income from the income prediction model, the estimated income and a self-reported income. The server data application can determine a verified income according to the income verification rule using the predicted income determined from the income prediction model, the self-reported income.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 4A, FIG. 4B, FIG. 4C, FIG. 4D, FIG. 4E, FIG. 4F, FIG. 4G, FIG. 4H and FIG. 4I depict one embodiment of a series of mobile application pages that may be displayed in a user application stage.

FIG. 10 is a flow chart illustrating one embodiment of an affordability determination.

FIG. 11 depicts rules for determining a monthly debt obligation from a credit report.

DETAILED DESCRIPTION

The invention and various features and advantageous details thereof are explained more fully with reference to the exemplary, and therefore non-limiting, embodiments illustrated in the accompanying drawings and detailed in the following description and appendices. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Embodiments described herein provide a computer system that provides a low friction operator interface on a mobile device. The low friction interface may incorporate data from diverse sources and auto-fill form fields with data from one or more sources. Embodiments described herein can be configured to minimize the amount of personally identifiable information (PII) and financial information that a user must explicitly input. According to one embodiment, the system may request the user input a minimum amount of PII and financial data so that the system can verify the user's identity/detect fraud, verify the user's income, run a credit check on the user and/or determine an affordability for the user. The system may enhance the PII provided by the user with additional information from distributed sources to build a rich profile of the user. Furthermore, the system can apply rules/models to the user profile to verify the user, automatically determine or verify a user's income and automatically determine the user's ability to pay an obligation with a high degree of certainty, very quickly (e.g., within a minute and some cases in less than ten seconds from receiving a request to approve an application).

The process approving a user application can be achieved using a simple operator interface on a mobile device and, in some embodiments, in a single client session in real-time. In some cases, if a user fails a step in the approval process, the system may request additional information from the user. Thus, the complexity of the interface may depend on the user or quality of information provided by the user.

Figure 1:
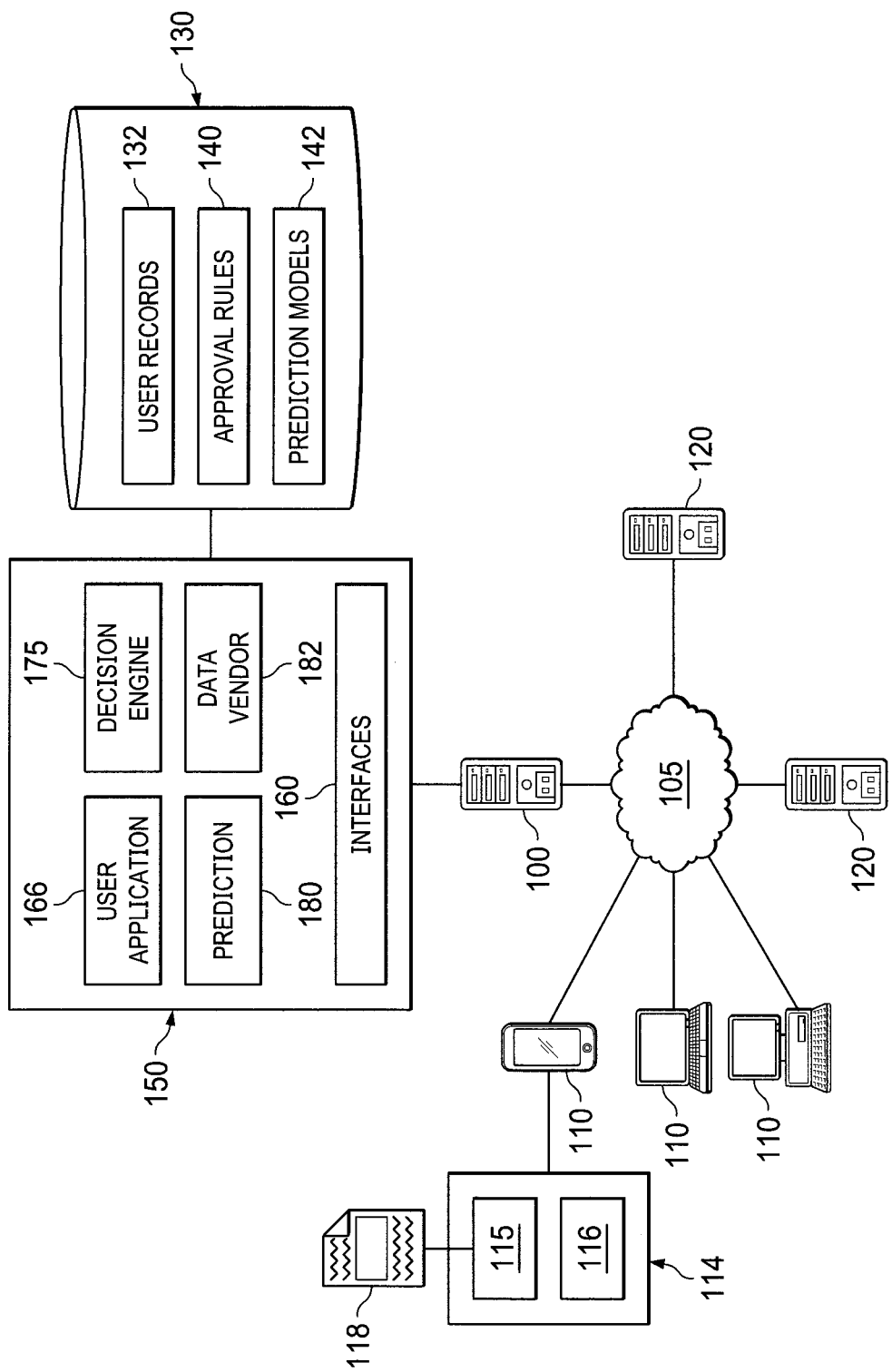
FIG. 1 is a high level block diagram of one embodiment of a network topology.

Embodiments of the systems and methods of the present invention may be better explained with reference to FIG. 1 which depicts one embodiment of a topology which may be used to implement certain embodiments. FIG. 1 is a high level block diagram of one embodiment of an example topology. The network topology of FIG. 1 comprises a data processing system 100 which is coupled through network 105 to client computing devices 110 (e.g. computer systems, personal data assistants, smart phones or other client computing devices). The topology of FIG. 1 further includes one or more information provider systems 120. Network 105 may be, for example, a wireless or wireline communication network such as the Internet or wide area network (WAN), publicly switched telephone network (PSTN) or any other type of communication link.

In accordance with one aspect of the present disclosure, data system 100 may be a data processing system that provides, for example, a computer system for automating and facilitating financing. Data system 100 may be provided, for example, by or on behalf of an intermediary that finances the purchase of vehicles or other assets by a consumer.

Data processing system 100 may comprise one or more computer systems with central processing units executing instructions embodied on one or more computer readable media where the instructions are configured to perform at least some of the functionality associated with embodiments of the present invention. These applications may include a data application 150 comprising one or more applications (instructions embodied on a computer readable media) configured to implement one or more interfaces 160 utilized by the data processing system 100 to gather data from or provide data to client computing devices 110 and information provider systems 120.

Data processing system 100 utilizes interfaces 160 configured to, for example, receive and respond to queries from users at client computing devices 110 and interface with information provider systems 120, obtain data from or provide data obtained, or determined, by data processing system 100 to any of client computing devices 110 and information provider systems 120. It will be understood that the particular interface 160 utilized in a given context may depend on the functionality being implemented by data processing system 100, the type of network 105 utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, APIs, libraries or other type of interface which it is desired to utilize in a particular context.

Data application 150 can comprise a set of processing modules to process obtained data or processed data to generate further processed data. Different combinations of hardware, software, and/or firmware may be provided to enable interconnection between different modules of the system to provide for the obtaining of input information, processing of information and generating outputs.

In the embodiment of FIG. 1, data application 150 includes a user application module 166 configured to interact with consumer users accessing system 100 via client applications 114 to obtain appropriate input information from the users to populate user applications for financing. User application module 166 further manages the user applications through an application approval lifecycle. Applications may be persisted as application records (user records) 132.

A decision engine 175 applies approval rules 140 to user application data provided by user application module 166 to approve or deny the application. Examples of approval rules 140 include, but are not limited to, fraud detection rules, identity verification rules, credit check rules, income verification rules and affordability rules. If an application is not approved, decision engine 175 may return the reason that the application was not approved. A failure to pass the approval rules may result in any configured action, such as withholding further information or services from the consumer, requesting the consumer re-enter information or provide additional information, and/or alerting an authority that of the failed check.

The application of approval rules 140 or other processes may leverage predictions. Prediction module 180 can apply prediction models 142 to data associated with the user application to generate prediction scores that may be used in processing the approval rules 140 or to enhance an application. By way of example, but not limitation, data processing system 100 may apply an income prediction model to generate a prediction of a user's income that can be used by an affordability rule to determine an affordability score for the user. As another example, data processing system 100 may apply a credit risk prediction model to generate a credit risk score for a consumer.

Approval rules 140 and prediction models 142 may require obtaining information from a number of third party distributed systems. As an example, application of an identity verification rule may require gathering information from an identity verification service provided by an information provider system 120. As another example, an income prediction model may require interacting with the computer systems of the user's bank to verify the consumer's current and recent income, as well as other relevant banking data.

Based at least in part on some of the user application data, a data vendor module 182 may perform interaction with one or more third party sources to obtain various types of information used in applying approval rules 140 and prediction models 142. For example, data vendor module 182 may interact, via appropriate APIs, with information provider systems 120 to collect fraud detection data, identity verification data, credit reports, income estimation data, income projection data and other data.

Furthermore, data processing system 100 may include data store 130 operable to store obtained data, processed data determined during operation and rules/models that may be applied to obtained data or processed data to generate further processed data. In one embodiment, data processing system 100 maintains user applications and other data. Further, in the embodiment illustrated, data store 130 is configured to store rules/models used to analyze application data, such as application approval rules 140 and prediction models 142. Data store 130 may comprise one or more databases, file systems or other data stores, including distributed data stores managed by data processing system 100.

Client computing devices 110 may comprise one or more computer systems with central processing units executing instructions embodied on one or more computer readable media where the instructions are configured to interface with data processing system 100. A client computing device 110 may comprise, for example, a desktop, laptop, smart phone or other device. According to one embodiment, a client computing device 110 is a mobile device that has a touchscreen display and relies on a virtual keyboard for user data input. Client application 114 may be a mobile application ("mobile app") that runs in a mobile operating system (e.g., Android OS, iOS), and is specifically configured to interface with data processing system 100 to generate application pages for display to a user. In another embodiment, the client application 114 may be a web browser on a desktop computer or mobile device. In accordance with one embodiment, a user can apply for a user account with the system 100 and apply to qualify for financing.

Turning to the various other entities in the topology of FIG. 1, information provider systems 120 may be systems of entities that provide information used in approving a user or purchase. Examples of information provider systems 120 may include computer systems controlled by credit bureaus, fraud and ID vendors, data vendors or financial institutions. A financial institution may be any entity such as a bank, savings and loan, credit union, etc. that provides any type of financial services to a participant involved in the purchase of an asset or other item. Information provider systems 120 may comprise any number of other various sources accessible over network 105, which may provide other types of desired data, for example data used in identity verification, fraud detection, credit checks, credit risk predictions, income predictions, affordability determinations and or other processes.

In accordance with one embodiment, a user can utilize client application 114 to register with data processing system 100, apply for financing, and perform other functions. Client application 114 can be configured with an interface module 115 to communicate data to/from data processing system 100 and generate a user interface for inputting one or more pieces of information or displaying information received from data processing system 100. In some embodiments, the application 114 may comprise a set of application pages through which application 114 collects information from the user or which client application 114 populates with data provided via an interface 160.

As discussed above, a user may apply for financing via client application 114. To this end, client application 114 may be configured with a series of application pages configured to collect user application data and display user application data. The data may be maintained at the client device 110 in a local representation of a user application 118 (a data structure configured to hold user application data). The local representation 118 may include application data to be sent to data processing system 100 or data received from data processing system 100.

The approval process relies on PII provided by the consumer to data system 100. Client application 114 is configured to provide a low friction interface that contains few, if any, form fields for the explicit input of PII. In a low friction implementation, additional PII (or other information) used in the approval process can be determined from the limited information provided by the user. In other words, client application 110 can provide an interface that asks the consumer a set of thin questions, which can be used to build a robust profile on the user.

Client application 114 can be configured to request a minimum amount of user identification information and financial information from a consumer to allow data processing system 100 to make a determination of whether the user is approved and the amount for which the user is approved. Preferably the mobile application pages are configured to minimize the number of fields that the user must populate for an approval determination to be made. The user supplied user identification information can be used to obtain additional consumer information from a variety of information provider systems 120.

In accordance with one embodiment, information provided by the user is correlated with information from various databases (e.g., credit reporting agencies, financial institutions) to build profile of customer. Client application 114 or data application 150 can, for example, receive a first, limited set of user record information from a first source (e.g., from the user), correlate the user record information with additional PII and accounting information from additional sources and use the additional PII and accounting information to enhance the user record (e.g., to produce an enhanced user record). The system may use the information from the (enhanced) user record to approve financing.

To make the experience convenient for the consumer, the system can gather a large portion, if not all, necessary information for the initial financial approval from an image scan of the consumer's government issued identification taken directly on the phone or other mobile device. The consumer has the ability to then confirm data. In one embodiment, an application page of mobile application 114 is configured to allow a user to input an image of an identification document for the user. Client application 114 may access a mobile device's picture roll or include an imaging module 116 that can access a camera of the client computing device 110 (for example, a smart phone camera) to take an image of a user identification document (for example, a scan or photograph of a driver's license, passport or other user identification document). The image of the user identification document is used to obtain PII for the user using an internal library or a remote information provider system 120. Data processing system 100 may use the PII input directly by the user, obtained using the user identification document image, or otherwise obtained to obtained additional consumer information, including financial information, associated with the consumer from information provider systems 120.

Figure 2:
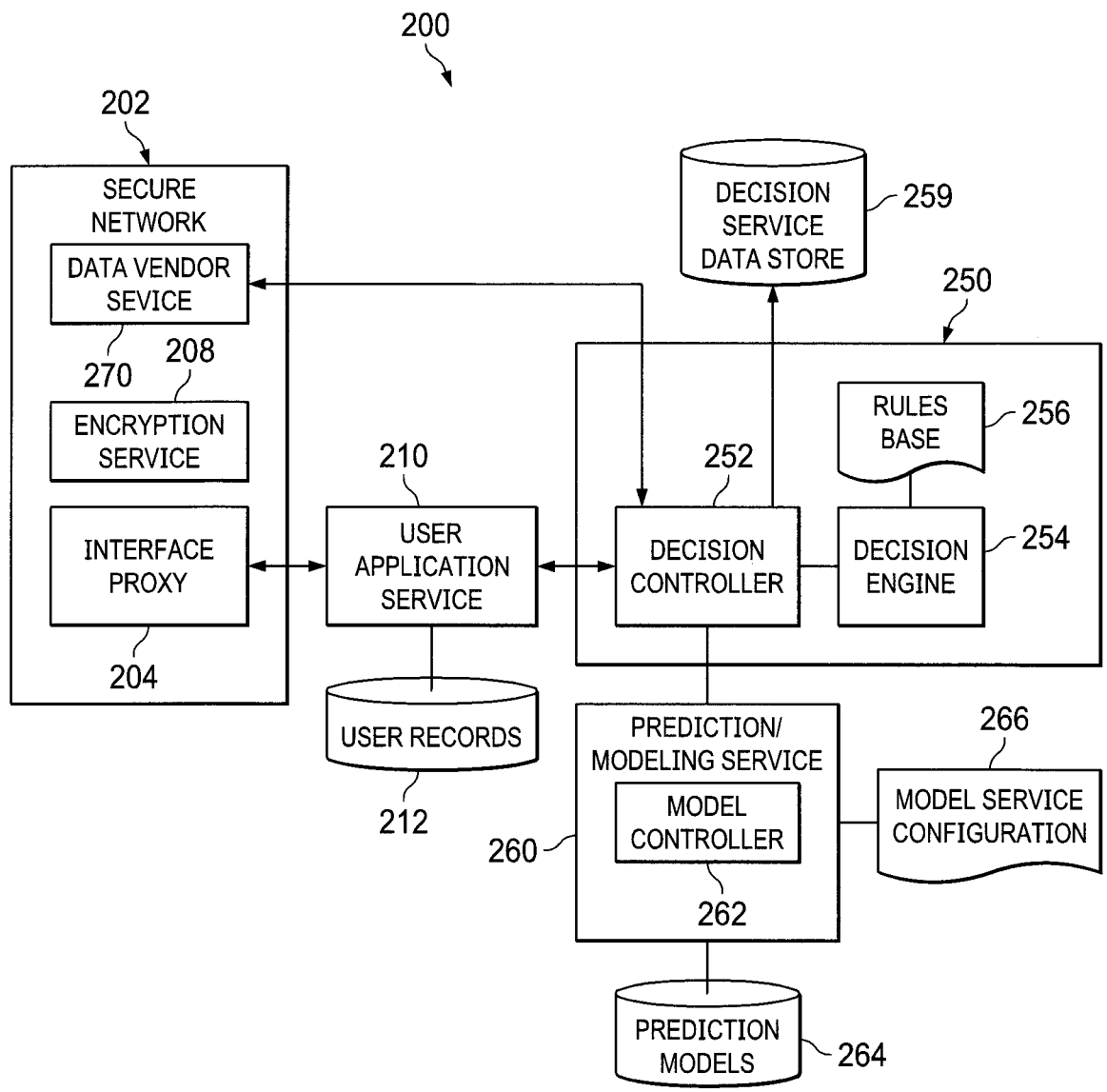
FIG. 2 is a block diagram of one embodiment of a software architecture of a data processing system.

According to one embodiment, various modules discussed above can be implemented as a set of services at one or more servers. FIG. 2 is a block diagram of one embodiment of a software architecture of a data processing system, such as data processing system 100. In the illustrated embodiment, the software architecture 200 comprises a number of services (which may be independently executing services) including secure network services 202, a user application service 210, a decision service 250, a prediction and modeling service 260 and data vendor service 270. Each of user application service 210, decision service 250, prediction and modeling service 260 and data vendor service 270 may also include interfaces, such as APIs or other interface, so that other services can send calls and data to and receive data from that service.

The services may utilize various data stores operable to store obtained data, processed data determined during operation, rules/models that may be applied to obtained data or processed data to generate further processed data and other information used by the services. In the embodiment illustrated, for example, user application service 210 stores user application records in user application service store 212 and decision service 250 stores data in data store 259. Other data stores are discussed below. The various services may utilize independent data stores such the data store of each service is not accessible by the other services. For example, each of user application service 210, decision service 250, etc. may have its own associated database.

Secure network services 202 include interfaces to interface with client computing devices 110 and information provider systems 120. The interfaces can be configured to, for example, receive and respond to queries from users at client computing devices, interface with information provider systems 120, obtain data from or provide data obtained, or determined, by architecture 200 to client computing devices or information provider systems 120. It will be understood that the particular interface utilized in a given context may depend on the functionality being implemented, the type of network utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, APIs, libraries or other type of interface which it is desired to utilize in a particular context. Secure network services 202 provide a walled off segment of the system the system. Certain unencrypted information, such as PII, is not available to other components of the software architecture outside of secure network services 202.

In the embodiment illustrated, secure network services 202 include an interface proxy service 204 that receives calls and data from client applications (e.g., client application 114 or web browser accessing a dealer portal) or services of architecture 200, routes calls and data to the services of architecture 200 and routes responses to the client application or calling service as appropriate. Interface proxy service 204 can provide authentication services, assigning unique user IDs to new users, authenticating users when they log back in to data processing system 100 and providing other functionality. Once a user has authenticated, interface proxy service 204 can provide context (such as a user ID) that can be passed with requests to other services.

Secure network services may also include data vendor service 270 configured to communicate with information provider systems 120 to request information from the information provider systems 120. For example, data vendor service 270 may include APIs for services at information provider systems 120, such as 3rd party services, that provide data incorporated in decisions. Data vendor service 270 may include APIs dedicated to each information provider system 120.

Encryption services 208 are provided to internally encrypt/decrypt sensitive information, such as PII, and other information received via data vendor service 270 and interface proxy service 204.

At least some data communicated between data processing system 100 and a client computing device may be encrypted beyond encryption generally used to encrypt communications (such as HTTPs). For example, PII provided by a client application (e.g., mobile application 114) may be encrypted according to a first encryption protocol. Interface proxy service 204 may forward the encrypted PII for use by other services, such as user application service 210, which cannot decrypt the information.

Information provider systems 120 may require PII to return information about a consumer (e.g., the API for a credit reporting agency information provider systems 120 may require inputting a name, address, social security number or other PII to receive a credit report). When data vendor service 270 receives encrypted PII from another service to send to an information provider system 120, data vendor service 270 can call encryption service 208 to decrypt the PII from the internal format and then data vendor service 270 can then encrypt the PII in the encryption format used for the API call to information provider system 120. Similarly if PII is received from information provider system 120 via data vendor service 270, data vendor service 270 can decrypt the PII according to the encryption/decryption used by the particular data vendor, call encryption services 208 to encrypt the PII according to the internal format and forward the encrypted PII to another service. Thus, PII is highly secure because, in some embodiments, it is only ever decrypted at secure network services 202 to be re-encrypted for forwarding to other services.

Interface proxy service 204 and data vendor service 270 may thus be configured with rules regarding which PII is to be encrypted by encryption service 208. Examples of information that can be considered PII based on the rules includes, but is not limited to: first name, last name, middle name, date of birth, email address, government ID numbers (social security numbers, driver's license number), address, driver's license bar code scan, driver's license image, phone numbers, signature, insurance card information, bank account number, bank account name, bank account balance, employment information or other information. In some embodiments, the rules will specify which fields of data in an input from a client application or response from an information provider system 120 are to be internally encrypted according to the internal encryption format.

User application service 210 is configured to receive user requests to register with the data processing system, manage user applications and communicate with client applications regarding user applications for approval. In particular, user application service 210 can receive requests to apply for financing along with associated consumer data. According to one embodiment, a request to initiate an application along with registration information (e.g., an email address) is received via an API call to interface proxy service 204 from client application 114. Interface proxy service 204 route the call and consumer data (for example, including the encrypted PII) to user application service 210. User application service 210 creates a user application having a unique application ID for the user. User application service 210 returns the application ID to client application 114 (via interface proxy service 204) for use in future communication regarding the application.

The user application may be managed as an object that proceeds through multiple states. The user application may be persisted in user application service data store 212 as a user application record, which may be one example of a user record 132. User application service 210 can further receive additional consumer information from client application 114 and enhance the user application record.

In an exemplary embodiment, user application service 210 is configured to receive an API request routed by interface proxy service 204 for an approval decision for a user application. User application service 210 generates a decision request to decision service 250 requesting an approval decision and provides the decision input attributes required for a decision. User application service 210 is configured to receive a decision result from decision service 250 and generate a response to client application 114. User application service 210 may also take other specified actions based on the decision result. When a user application is approved, user application 210 may pass context information to other services, such as e-commerce services that can use the approval to permit purchasing assets. Such context information may include, for example, consumer PII, user ID, application ID, an affordability score, a credit risk score or other information used by the downstream services.

Decision controller 252, according to one embodiment, is the main application layer of decision service 250 that routes calls between services and is responsible for logging actions. Decision controller 252 is configured to receive requests for decisions from other services and return decision results. Decision controller may assign a decision request a unique decision identification and return the decision identification to the requesting service. Decision controller 252 may pass a request for a decision along with relevant input data to decision engine 254 and pass the decision result to a requesting service.

Decision engine 254 is a rules-based software system that provides a service that executes decisions on decision inputs in a runtime production environment to generate a decision output. Executing a decision can include applying a set of decision rules to the data to approve/disapprove the action and/or take some responsive action, such as generate an output.

A decision input defines the set of data for which a decision will be made. In data processing system 100, the decision input may be some minimum set of information needed to approve a user and/or a particular transaction, such as the user's name, address, social security number, driver's license number or other information used in the decision process. These values may be encrypted and/or tokenized when passed to decision controller 252. At least a portion of the data to be included in a decision output may be specified by the decision executed.

A decision may have an associated "kind" that indicates the type of decision being implemented. The decision "kind" can be used by other services (e.g., user application service 210) to request a decision or other decisions to reference that decision (to create a tree of decisions). Decision base 256 specifies, for each decision type, rules on how to interpret data to approve/disapprove users or transactions, determine products to offer or make other decisions consistent with regulations, business policy or other constraints. For example, the decision base 256 may specify the approval rules 140 to be applied.

In general, decision engine 254 executes a decision to determine if a set of data meets conditions specified in the decision rules for the decision type and generates an output based on the application of conditions to the data. The data to which the conditions are applied may or may not include the decision inputs. Decisions may reference data sources defined by decision service 250, predictions from data modeling services and prediction services 260 and sub-decisions and contain rules that are applied to data obtained from information provider systems 120, prediction scores from prediction and modeling service 260, sub-decisions, decision inputs or other data.

If a decision references a prediction, decision engine 254 can generate a prediction request to prediction and modeling service 260. Prediction and modeling service 260 can apply a prediction model to a set of prediction inputs to return a prediction score. A prediction model may be a set of user defined prediction rules or a machine learning model.

According to one embodiment, prediction and modeling service 260 comprises a model controller 262 that receives prediction requests and delegates the request to the correct prediction model 264 based on rules or to a specific model if the specific model is specified with the prediction request. For example, model controller 262 can be configured to delegate a request for an income prediction to a currently active income prediction model if the income prediction request does not specify a particular income prediction model. In this case, prediction and modeling service 260 can process the request using the currently active income prediction model. Modeling service configuration data 266 specifies what models are used and what models are active.

Decisions and prediction models may require data from information provider systems 120. Data vendor service 270 can be used to collect data from information provider systems 120. According to one embodiment, decision service 250 can define and manage data sources, data source versions, data source arguments, and data source records. A data source specifies a set of data from one or more information provider systems 120 (e.g., 3rd party services provided by information provider systems 120) that can be passed to other services. For example, a data source may be a report containing data gathered from one or more information sources 120. The decision service 250 can maintain a definition of the arguments needed to collect the data for an instance of a data source version, receive argument values from other services, collect the data via data vendor service 270 and pass the data source instance to the requesting service or use the data source instance in executing a decision. Decision service 250 may further cache data source instances for faster retrieval in response to a subsequent request for the data source instance.

According to one embodiment, when decision controller 252 receives a request for a decision, decision engine 254 confirms what data is required to retrieve a data source instance from an information provider system 120 to execute the decision prior to executing an API call to data vendor service 270. For example, if decision engine 254 requires "Report A version 1" data source when processing a request to qualify a user, and a social security number is required to fetch that report, decision engine 254 can cross reference the required arguments for fetching said data source with the arguments provided to decision service 250 for the generating the decision and assess whether the dependencies have been met, resulting in a fetching of the data source report, or not, resulting in decision service 250 responding to the user application service 210 with what further arguments are needed. In response to a complete set of arguments, i) decision engine 252 passes the arguments (which may be encrypted or tokenized) to data vendor service 270, ii) data vendor service 270 collects the Report A version 1 instance from an information provider system 120 via the API for system (which may use encryption service 208 to decrypt/encrypt PII) and iii) data vendor service 270 provides the Report A version 1 instance to decision engine 254. Furthermore, decision service 250 may cache the report instance so that it can respond to requests for the report within a specified time window with cached data rather than fetching the data again from the information provider system. In some cases, the decision may specify a 'force' fetch of a data source, such that decision service 250 fetches a fresh report from data vendor service 270 (e.g., from the third party vendor) rather than using a cached report instance.

Similarly, according to one embodiment, when the decision engine 254 receives a request for a decision, the decision engine 254 may not know what data is required to make a prediction required by the decision. The decision engine can call over to the prediction and modeling service 260 and prediction and modeling service 260 informs the decision engine 254 of the data needed for the prediction. For example, if decision engine 254 makes a call to prediction service 260 for an "Income Prediction version 1", the prediction service can inform decision engine 254 of the data sources or other data needed to make the prediction. In response, i) decision engine 254 communicates with data vendor service 270 to collect the data sources as described above; ii) passes the data source instances or other data to the prediction service 260; iii) receives the results of the requested prediction from the prediction service 260.

Any data sources required and the data from the data sources used by particular rules in decision making can be specified in the decision rules in decision base 256 or prediction models 262 stored in modeling service configuration data 262 rather than the decision engine code. From the perspective of decision engine 254, gathering data sources and receiving the results of predictions is simplified as decision engine 254, in some embodiments, need only be able to request a data source instance from and pass arguments to data vendor service 270 to receive a data source instance and request a prediction from and pass arguments to prediction service 260 to receive prediction results from service 260.

Thus, based on the decision type and decision input attributes for the decision that decision engine 254 is being requested to make, decision engine 254 can access the appropriate rules (e.g., from decision base 256), retrieve the required data sources and/or prediction scores, process the decision rules to generate a decision result and return the decision result to the requesting service. The decision result may include the ID of the decision and metadata about the decision including, for example, an indication of whether the decision result was a pass or a fail, prediction scores generated when making the decision, decline codes indicating why the decision failed or other decision metadata.

Decision controller 252 returns the decision result to the calling service (e.g., user application service 210). Decision controller 252 may also store data associated with the decision in decision service data store 259 (such as, but not limited to, decision type, decision inputs, model identifier, prediction inputs, prediction scores, data source instances, decision result metadata).

User application service 210 is configured to update the appropriate user application record with the decision result data to update the state of the user application. User application service 210 further includes rules to map decision results to actions. According to one embodiment, if the decision result indicates a pass, user application service 210 can generate a response to the preapproval requesting from client application 114 including data, such as the affordability score, and send the response to the client application 114 via interface proxy service 204. Client application client application 114 can be configured to proceed to a next stage in a purchase process by, for example, displaying an application page corresponding to the next stage on the client computing device 110.

User application service 210 can categorize decline codes as soft and hard declines. Soft decline codes may be mapped to responses to request additional information or provide instructions to the user to take some action, such as call a customer service representative. Based on the soft decline code, user application service 210 can generate the appropriate response and send the response to the client application 114 via interface proxy service 204. Based on the decline response, client application 114 can display the appropriate application page to allow the user to input additional information or provide instructions to the user on how to continue the application stage. In response to receiving the requested additional information from the user, user application service 210 can request that the preapproval decision be reevaluated by decision service 250.

A hard decline, on the other hand, terminates the application stage. User application service 210 may send a hard decline response to client application 114 and client application 114 can display an application page indicating that the user application has been denied and the reasons for the denial. In some cases, user application service 210, responsive to a hard decline code, may send the user application record data to a service configured to report the decline to a credit reporting agency, generate a letters to report the hard decline or take other actions.

Figure 3:
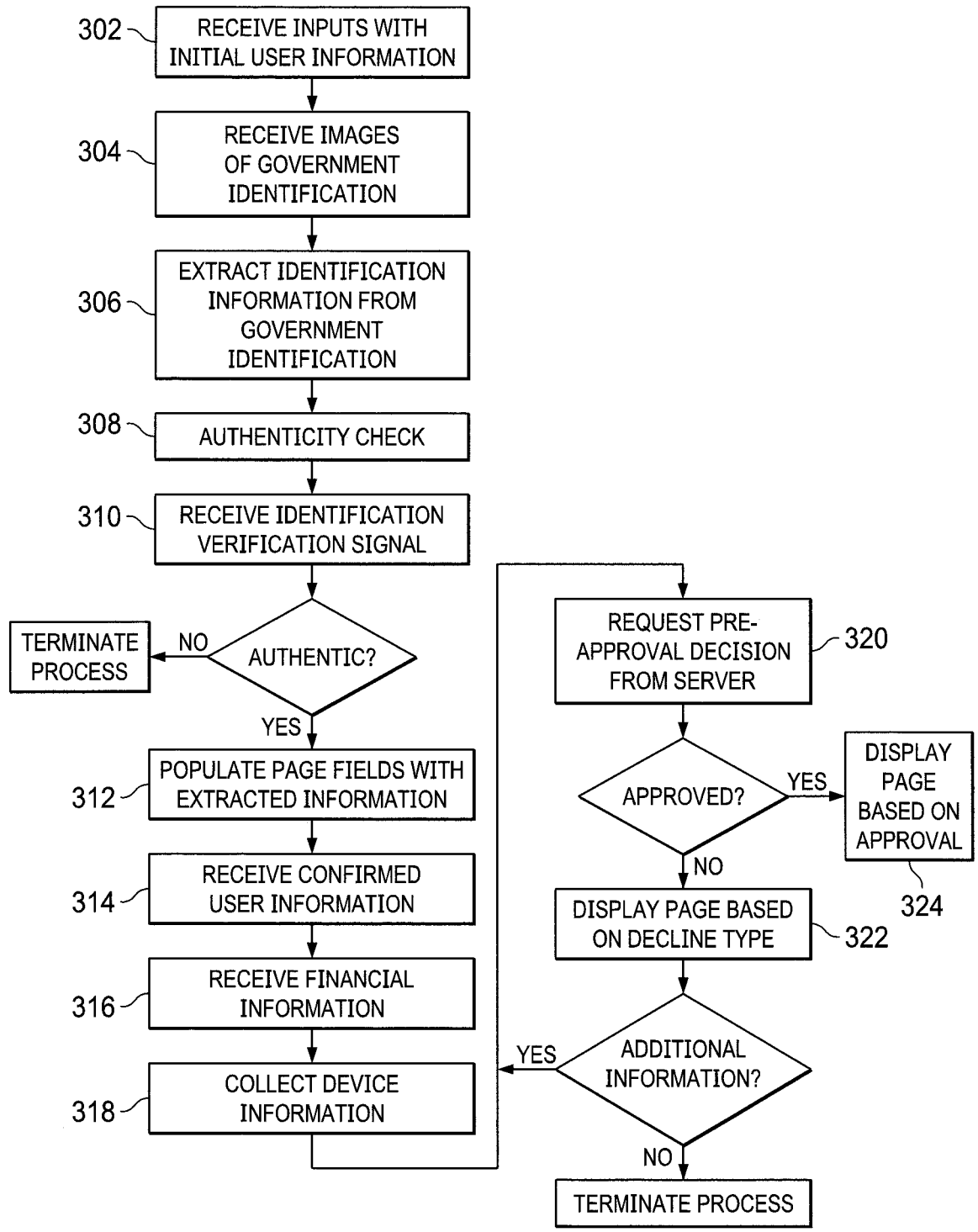
FIG. 3 is a flow chart of one embodiment of a method corresponding to a user application stage.

FIG. 3 is a flow chart of one embodiment of a method corresponding to a user application stage. FIGS. 4A-4I are diagrammatic representations of application pages displayed by one embodiment of a client application 114 on a mobile device.

With reference to FIG. 1, FIG. 3 and FIGS. 4A-4I, the application approval process relies on PII provided by the consumer to data processing system 100. In some embodiments, a user many manually enter all of the PII used in the approval process. In accordance with other embodiments, however, client application 114 is configured to provide a low friction interface that contains few, if any, form fields for the explicit input of PII. In a low friction implementation, data processing system 100 can determine PII (or other information) used in the approval process from the limited information provided by the user. In other words, client application 114 can provide an interface that asks the consumer a set of thin questions and data processing system 100 can build a robust user profile for the consumer.

A user may download the application and register for an account on data processing system 100 and provide PII to data processing system 100. To this end, client application 114 can be configured with an interface module 115 to generate a user interface for inputting one or more pieces of PII and financial information, which can be temporarily stored in representation of the user application 118. At various points in the application process, client application 114 can forward information from representation of the user application 118 to data processing system 100.

PII collected may include, but is not limited to, the user's full name, driver's license number, home address, date of birth, social security number, email address, telephone number, driver's license expiration date, license plate number, bank account numbers or other PII. Accounting information may include information such as weekly, monthly, or annual income, debts owed by the user and other financial information that can be verified against information from other sources of financial information.

According to one embodiment, the user only supplies a small amount of PII and the system enhances the user record with additional information from distributed sources. For example, in one embodiment, client application 114 prompts the user to provide only a limited number of inputs, such as a portion of the following:

Registration information: information sufficient to create a user account or access an existing user account at data processing system 100. The registration information may include, for example, email, password;

Image of driver's license or other government ID;

Phone number of mobile device;

Self-reported income (e.g., yearly, monthly, weekly);

Bank account access information.

Client application 114 may also prompt the user to log into his or her bank account so that data processing system 100 may access the consumer's financial information.

Figure 4B:
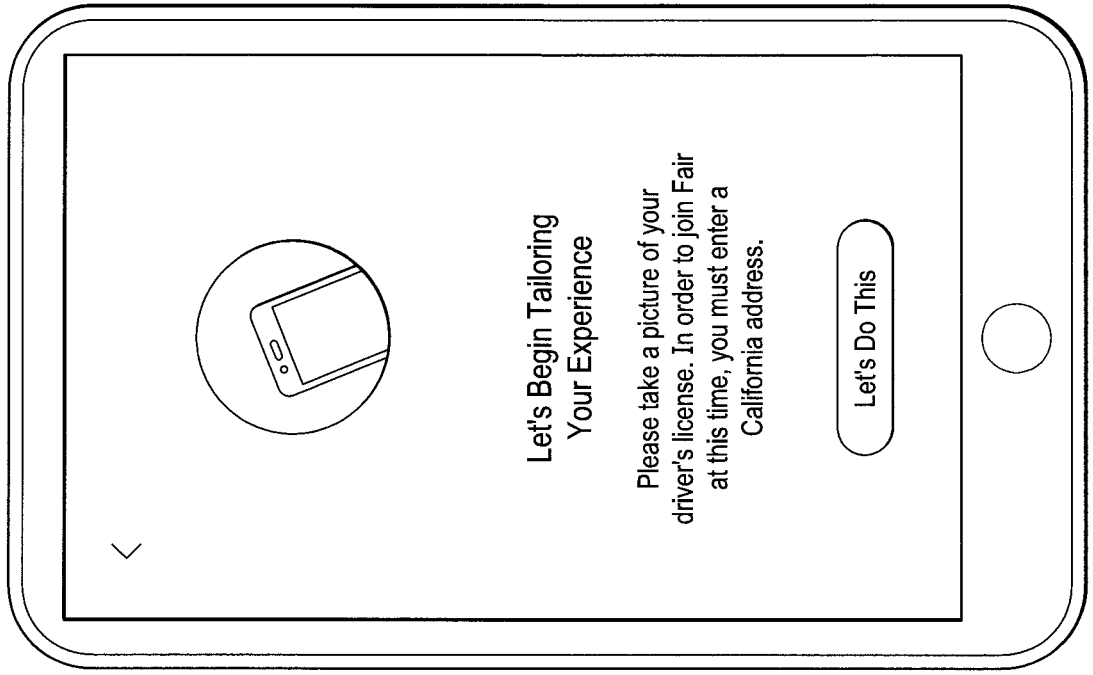
Figure 4A:
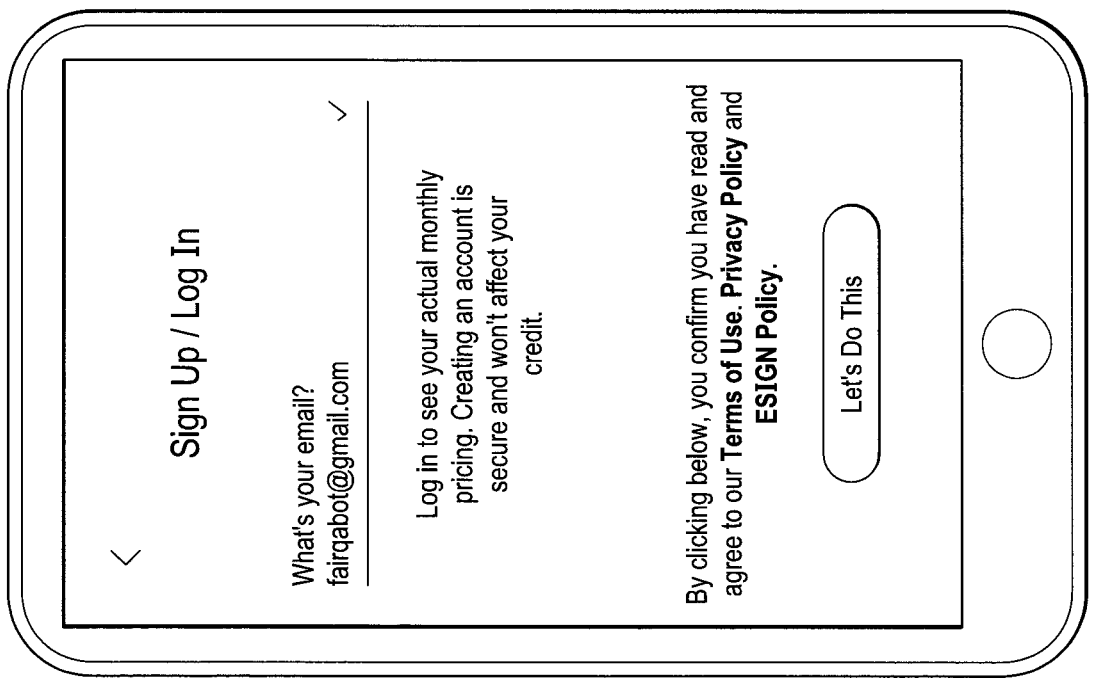

At step 302, client application 114 presents a page to collect an initial set of user information used to initiate the user application process. As illustrated in FIG. 4A, client application 114 provides an application page through which a user may provide an email address. In some cases, the user may also provide an account password. Based on a signal indicating that the user wishes to proceed with the application process—for example, based on the user's selection of the "Let's Do This" virtual button in FIG. 4A, client application 114 can submit a request to initiate an application to data processing system 100. Data processing system 100 can assign a unique user ID to the user and user application identifier to the application, which can be returned to client application 114.

Figure 4C:
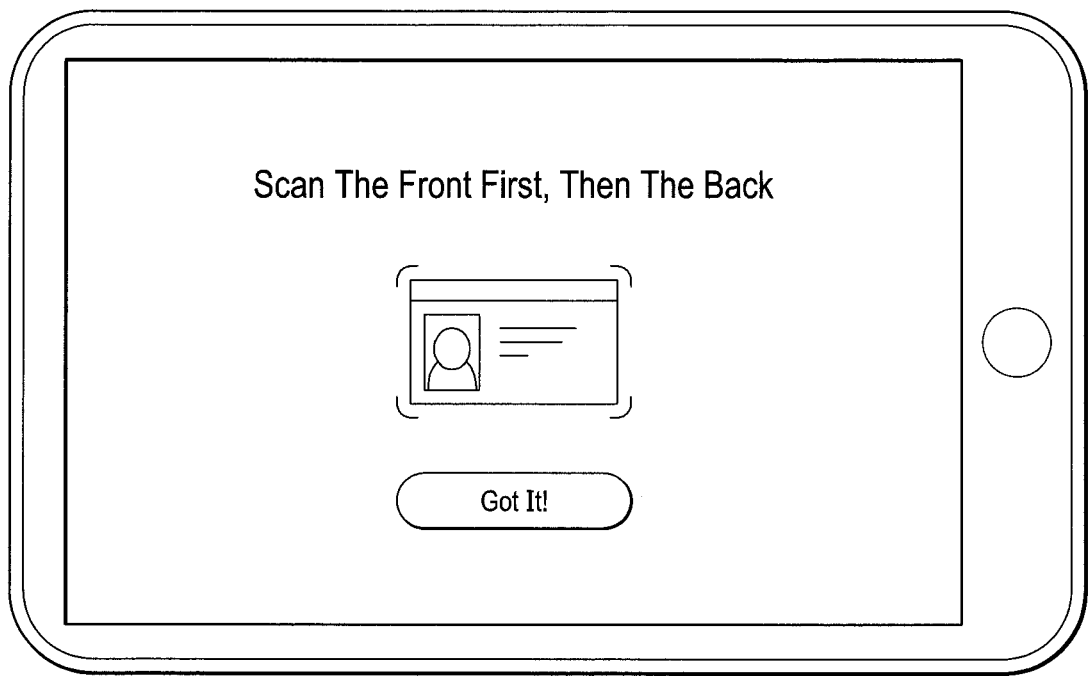

Furthermore, an image (a scan or digital photograph) of the user's government identification can be used to enhance PII without requiring explicit field inputs for each piece of information. To this end, client application 114 can receive an image of a government identification (step 304). For example, client application 114 can be configured to access a mobile device's picture roll to allow a user to select images of the user's government ID already present on the camera roll. In another embodiment, client application 114 can include an imaging module 116 that can access a camera of the client computing device 110 (for example, a smart phone camera) to take an image of a user identification document (for example, a scan or photograph of a driver's license, passport or other user identification document). As illustrated in FIG. 4B and FIG. 4C, client application 114 presents a series of application pages to prompt the user to image one or both sides of the user's driver's license, including the driver's license barcode and provide controls to allow the user the capture the images. According to one embodiment, client application 114 may forward the images of the government document to data processing system 100. In the example of FIG. 2, user application service 210 can update the user application record with the images. In other embodiments, the images may be stored in representation of the user application 118 and forwarded to data processing system 100 at a later time.

Additional PII can be obtained from the images of the government ID through OCR recognition and machine symbol recognition techniques. For example, a variety of information may be extracted from a driver's license barcode including, but not limited to, the user's full name, home address, date of birth, driver's license number and driver's license expiration date. Thus, at step 306, additional PII can be extracted from the image of the government identification. In some embodiments, client application 114 or data application 150 may include code to OCR the government identification or read symbols (e.g., driver's license barcode) to extract the encoded information. In another embodiment, client application 114 or data application 150, at step 306, may leverage third-party services to extract information from the images of the government identification. For example, a number of data vendors including, but not limited to, Confirm Inc. of Boston, Mass. and Mitek of San Diego, Calif. provide Internet-based services that allow an application to submit an image of a driver's license and return extracted information. Client application 114 or data application 150 may therefore include an interface (e.g., API, library) to provide the image of the government identification to an information provider system 120 that extracts information from images of government identifications (e.g., services that read encoded information from driver's license barcodes) and receive the extracted information in return. Whether the information is extracted by client application 114, data application 150 or a third-party service, the user application record can be enhanced to include PII determined from the information explicitly provided by the user.

At step 308 the authenticity of the government identification may be checked. Client application 114 or data application 150 may include code to verify the authenticity of the identification or may leverage third party identification verification services. According to one embodiment, client application 114 or data application 150 may, for example, include an interface (e.g., API, library) to provide the image of the driver's license to an identification verification service. For example, Confirm Inc. of Boston, Mass. (https://www.confirm.io/confirm-id) and Mitek of San Diego, Calif. and a number of other data vendors provide services that extract data from an images of a driver's license, analyze the scanned identification and return identification verification signals indicating if a scanned identification is authentic (pass) or fraudulent (fail). Thus, for example, client application 114 may include an interface for an identification verification service and be configured to send the images input at step 304 to the identification verification service.

Client application 114 (or data application 150) may therefore receive an identification verification signal in response to sending the scan of the consumer's driver's license to the identification verification service (step 310). In some cases, the identification verification signal and the extracted data are requested from the same service and are received in the same response. A failure for the identification to verify may result in any configured action, such as withholding further information or services from the consumer, requesting the consumer re-enter information or requesting that the consumer provide additional information. For example, if the identification verification service indicates that the identification fails, client application 114 or data application 150 can terminate the application process.

Client application 114 can pre-fill a number of fields in an application for the consumer based on the extracted government identification information (step 312) and give the consumer the option to confirm/update information that may have changed since the identification document issued (e.g., the user may update the residence address if the user has moved, but not yet updated his or her driver's license). At step 314, client application can receive confirmed user information that may include the same values that were pre-populated in the fields of the application page or updated (edited) values. Client application 114 can upload the confirmed user information to data processing system 100. For example, FIGS. 4D and 4E illustrate example application pages with data extracted from the user's driver's license populated in editable fields. The user may edit the information and interact with a control (e.g., "Looks Good" virtual button in FIG. 4E) to submit the user information as originally populated or updated by the user. In response to an input signal based on user interaction in the GUI (e.g., in response to the user tapping the "Looks Good" virtual button), client application 114 can send the additional user information to data processing system 100 to update the user application record. In the example of FIG. 2, user application service 210 may update the user application record in user application service data store 212 with the received information. In other embodiments, the confirmed user information may be stored in representation of the user application 118 and forwarded to data processing system 100 at a later time.

Client application 114 may also receive financial information used in the application process (step 316). FIG. 4E, for example, illustrates an embodiment of an application page that allows a user to submit a self-reported income. In response to an input signal based on user interaction in the GUI (e.g., in response to the user tapping the "Next" virtual button), client application 114 can send the financial information to data processing system 100 to update the user application record. In the example of FIG. 2, user application service 210 may update the user application record in user application service data store 212 with the received information. In other embodiments, the received financial information may be stored in representation of the user application 118 and forwarded to data processing system 100 at a later time.

At step 318, client application 114 collects a set of device information, such as GPS location of the mobile device, operating system, mobile device ID or other information of the device on which client application 114 is executing. Client application 114 can send the device information to data processing system 100 to update the user application record. In the example of FIG. 2, user application service 210 may update the user application record in user application service data store 212 with the received information. In other embodiments, the received financial information may be stored in representation of the user application 118 and forwarded to data processing system 100 at a later time.

Figure 4G:
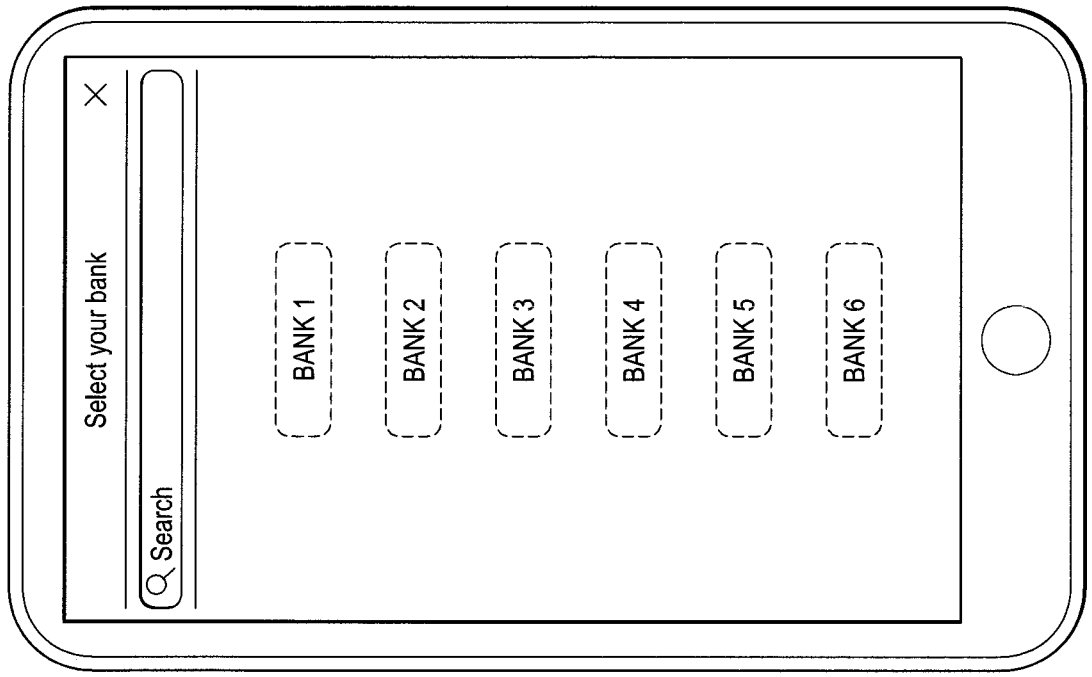
Figure 4F:
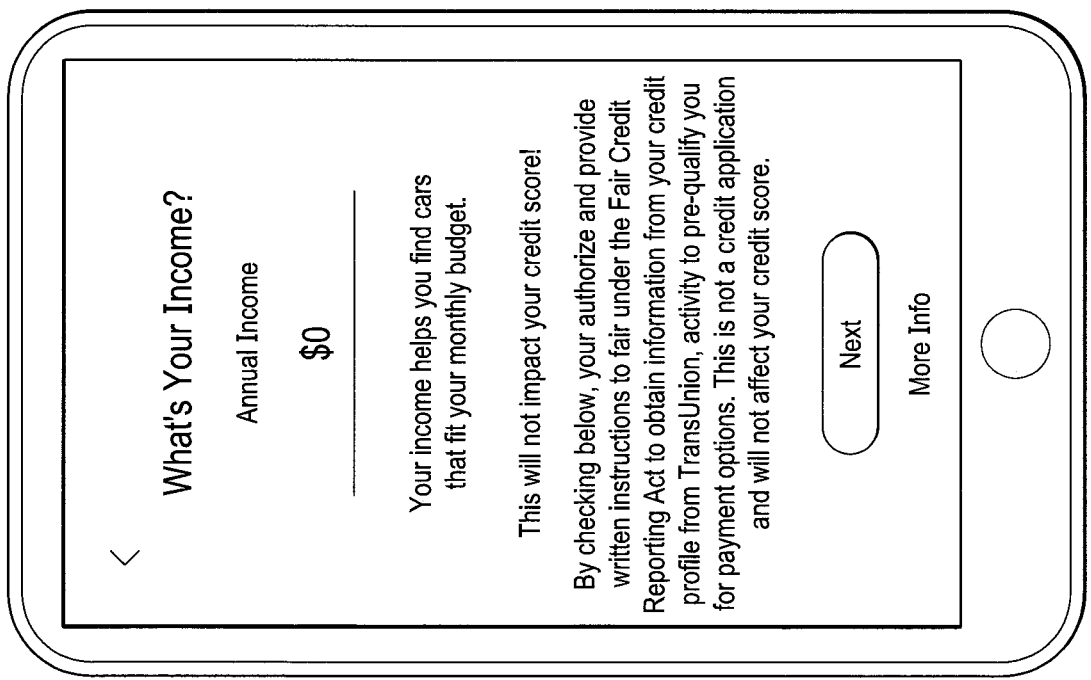

In response to an input signal based on user interaction in the GUI (e.g., in response to the user tapping the "Next" virtual button in FIG. 4F) client application 114 can send a request to data processing system 100 for an approval decision (step 320). Client application 114 may also send any data in representation of the user application 118 that has not yet been forwarded to data processing system 100 to data processing system 100.

Figure 4I:
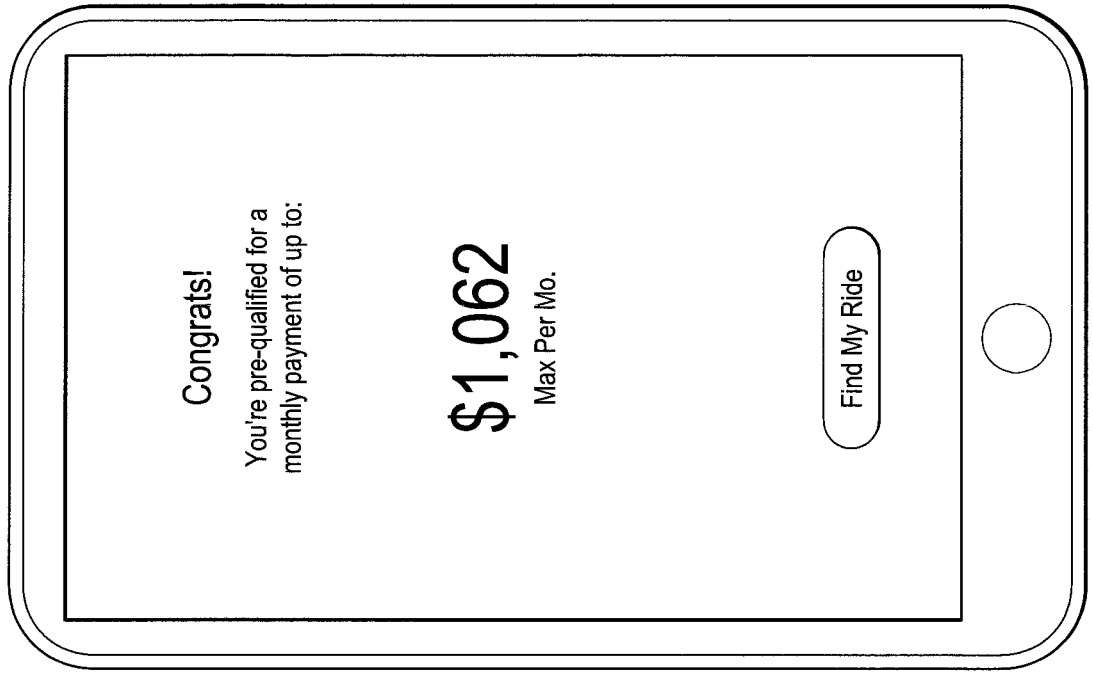
Figure 4H:
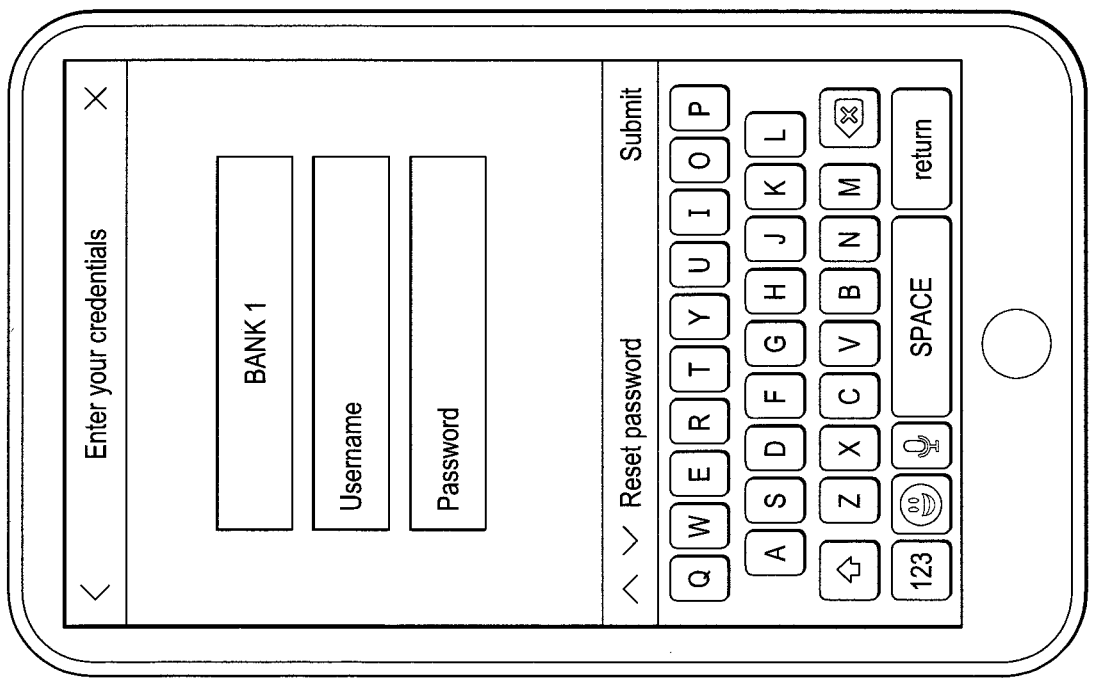

In response to a request for an approval decision, client application 114 receives a decision response. The decision response may include an indication of whether the decision result was a pass or a fail, prediction scores generated when making the decision, decline codes indicating why the decision failed or other decision metadata. If the decision response indicates a "fail" (i.e., the application was not approved), the application may display a page associated with the decline code to the user (step 322). For example, if the decline code indicates that the user's income could not be verified, as discussed below, client application 114 may display a series of pages indicating the reason the application was declined and a page requesting that the user provide bank account information so that the user's self-reported income can be verified against the user's financial transactions. For example, FIG. 4G and FIG. 4H illustrate embodiments of pages that allow a user to select his/her bank and provide information to link to the bank account. In response to an input signal based on user interaction in the GUI (e.g., in response to the user tapping the "Submit" virtual button), client application 114 can send the user's bank information to data processing system 100 to update the user application record. In some cases, the information to link to the bank account may include an account number. In the example of FIG. 2, user application service 210 may update the user application record in user application service data store 212 with the received information. In other embodiments, the bank information may be stored in representation of the user application 118 and forwarded to data processing system 100 at a later time. If the user provides the requested information, client application 114 can forward the information to data processing system 100 and re-request the approval decision.

If the decline code indicates a hard decline, client application 114 may display an application page indicating that the user application has been declined and terminate the process. If the decline code indicates a pass, client application 114 displays a page associated with the approved status (step 324). For example, client application 114 may display a page that indicates an amount for which the user has been approved (an affordability score). FIG. 4I, for example, illustrates one embodiment of an application page indicating that the user has been approved for a particular payment amount. The amount displayed can be populated with data received from data processing system 100. In response to an input signal based on user interaction in the GUI (e.g., in response to the user tapping the "Find My Ride" virtual button), client application 114 can display an application corresponding to a next stage in the purchase process. While in the illustrated example, the purchase process involves the purchase of a vehicle, other embodiments may use the affordability score in other purchase processes.

In the example of FIGS. 4A-4F the user is only required to enter an email address, an image of his/her driver's license and a self-reported income to receive an approval response that indicates a pass, assuming the user application is approved based on the first request for approval (step 320). The user only has to enter bank account information prior to initial approval if the user application fails to pass the approval. In other embodiments, the user may be required to enter additional information before requesting or receiving approval.

Figure 5:
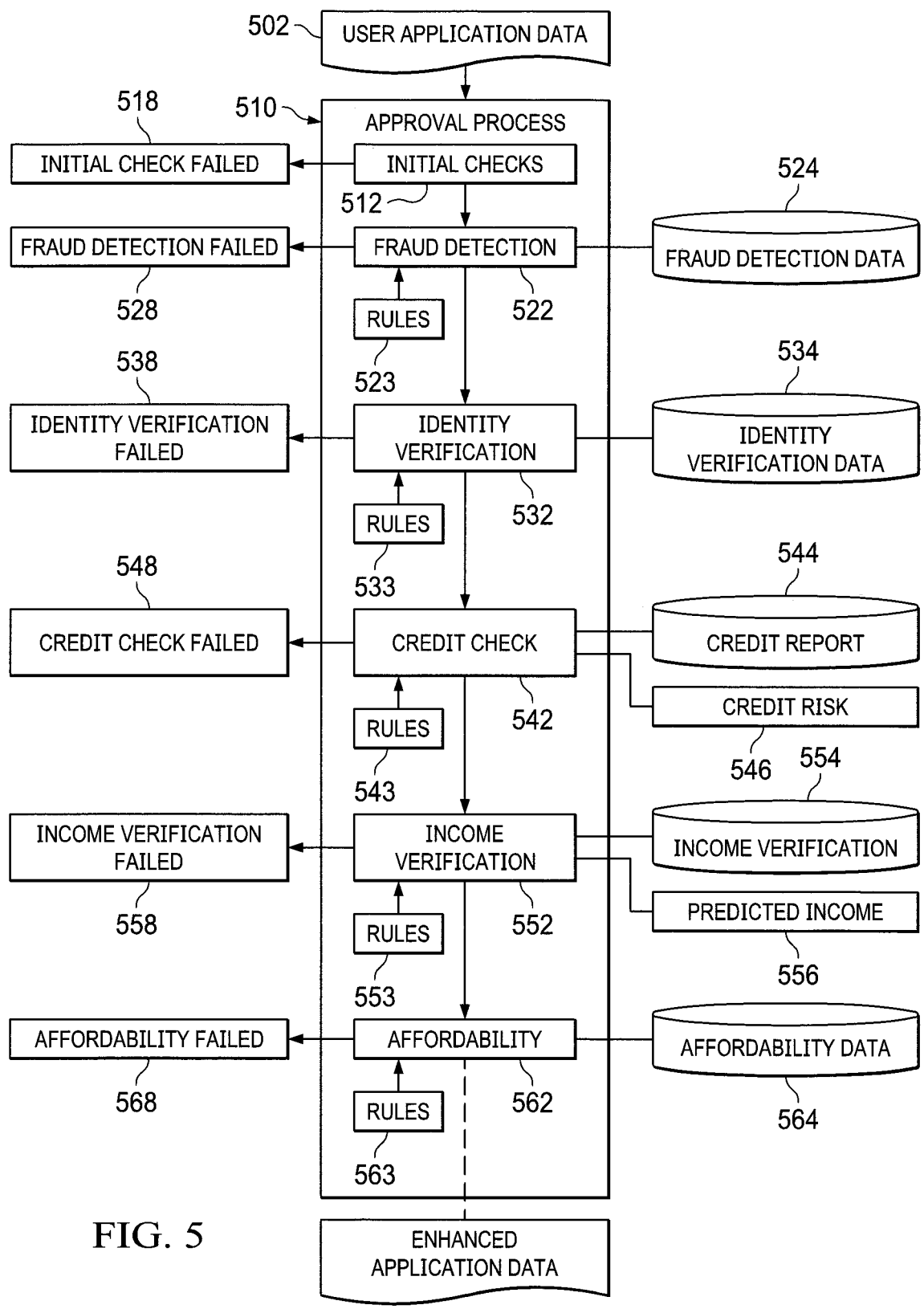
FIG. 5 is a block diagram illustrating one embodiment of a process to approve a user application.

FIG. 5 is a block diagram illustrating one embodiment of an approval process 510 to approve a user application 502. As discussed above, data processing system 100 may receive a request to approve application 502 from client application 114. In the embodiment of FIG. 5, data application 150 applies approval rules comprising initial checks, fraud detection rules 523, identity verification rules 533, credit check rules 543, income verification rules 553 and affordability rules 563. In one embodiment, the approval rules may be implemented as one or more decisions executed by decision service 250.

Data application 150 can apply rules 140 to the fraud detection data 524, identity verification data 534, credit report 544, credit risk score 546, income verification data 554, predicted income 556, affordability data 564 and other data. Depending on the results at various steps of the registration and approval process, client application 114 may prompt the user to supply additional information. For example, the user may be prompted to supply additional bank account login information if the user's identity and income level cannot be verified against information provided by a credit bureau or if the user's income is below a threshold based on available bureau information. Thus, the approval interface may have different degrees of friction for different consumers, depending on the results of applying rules 140.

The approval rules may incorporate one or more predictions. For example, credit check rules 543 may reference credit risk score 546 provided by a credit risk predication model and income verification rules 553 may reference a predicted income 556 provided by an income predication model.

The prediction models and approval rules may reference data from information provider systems 120 to which the rules/predictions apply. For example, approval rules or predictions may reference a data source defined by decision service 250. Data processing system 100 can obtain an instance of the data source from the appropriate information provider system 120 using an API. Data processing system 100 can determine the data from an information provider system 120 required to execute a rule and obtain the specified information corresponding to the application 502 from the appropriate information provider system 120 (or cache).

At step 512, data application 150 applies a series of initial checks to prevent further processing if it is known that a user will not be approved for financing. When processing approval rules to evaluate a particular application, the initial checks 512, according to one embodiment, are checks applied prior to data application 150 obtaining information from information provider systems 120 referenced by subsequent approval rules. For example, data application 150 may be configured with minimum self-reported income limits (e.g., self-reported monthly gross income>'x'), a minimum age (e.g., DOB before 'y'), only be available to users in certain jurisdictions. For example, if the self-reported income collected at step 316 is less than a threshold, say $3000 or other threshold set in the rules, the application 502 may not pass initial checks 512. While $3000 is used as the example, the threshold may be set based on rules. In some embodiments, a machine learning model may be used to set the threshold minimum income.

If the user application 502 fails the initial checks, data application 150 can generate a decision result 518 indicating the reason that the application was not approved. The decision result may be stored in application 502. Further, data application 150 may send a decision response to client application 114 indicating that the application was not approved and the reason the application was not approved. Client application 114 can display one or more pages indicating why the application was not approved and, in some cases, request additional information. Failure of an initial check may result in any configured action, such as withholding further information or services from the consumer, requesting the consumer re-enter information or requesting that the consumer provide additional information.

At step 522, data application 150 applies online fraud detection rules 523 to determine if the application data indicates online fraud. In one example, data application 150 can determine if the device attributes stored in application 502 (e.g., device attributes collected at step 318) indicate an instance of online fraud, such as indication that the client device 110 is being fraudulently used. Fraud detection rules 523 may leverage data from distributes sources. A number of fraud data vendors provide online fraud detection services that, in response to receiving particular input parameters, provide online fraud detection signals indicative of a risk of online fraud. Some examples of fraud data vendors include, but are not limited to, Iovation of Portland, Oreg. (iovation-.com) or ThreatMetrix, Inc. of San Jose, Calif. provide online fraud detection services. The fraud detection rules 523 may be tailored for the specific online fraud detection parameters 524 returned by the fraud data vendor information provider systems 120.

Data application 150 processes fraud detection rules 523, determines the fraud detection data 524 from fraud data vendors required to execute the fraud detection rules 523, makes a call to the online fraud detection service (e.g., an information provider system 120), provides information from application 502 to the online fraud detection service, receives responsive fraud detection data 524 and applies fraud detection rules 523 to the fraud detection data 524.

As an example, a fraud detection rule may apply a condition to a threatmetrix_review_status value. The threatmetrix_review_status parameter is a pass/fail flag that is based on an aggregate of GPS location, and device profile attributes associated with the applicant provided by Threatmetrix. Data application 150 can be configured to supply the GPS, location and device profile attributes from application 502 to the information provider system 120, receive the threatmetrix_review_status value and apply the conditions specified in the fraud detection rules. For example, a rule may specify that the threatmetrix_review_status returned in response to a particular set of application must indicate a pass for application 502 to pass device fraud detection rules 522.

If the user application 502 fails to pass the fraud detection rules 523, data application 150 can generate a decision result 528 indicating the reason that the application was not approved. The decision result may be stored in application 502. Further, data application 150 may send a decision response to client application 114 indicating that the application was not approved and the reason the application was not approved. Client application 114 can display one or more pages indicating why the application was not approved and, in some cases, request additional information. Failure to pass step 522 may result in any configured action, such as withholding further information or services from the consumer, requesting the consumer re-enter information or requesting that the consumer provide additional information.

At step 532, data application 150 applies identity verification rules 533 to determine if the user identification information from application 502 can be verified against other sources of data or if any of the user information is indicative of fraud. In particular, the application data can be verified against data from one or more identity fraud vendors. A number of providers provide online services that, in response to receiving particular input parameters, provide data that can be used to verify identity according identity verification rules 533. One example of an information provider system 120 that provides an identity verification service is Innovis of Columbus, Ohio. Innovis maintains a database of financial information, including information from public sources, credit bureaus and other sources. The Innovis system allows other systems (e.g., data processing system 100) to provide information such as names, home addresses, email addresses and phone numbers and returns an indication of whether the information provided matches other records in the Innovis database. Innovis may check for records that match, for example, a name, address, name and phone number, name and date of birth, provided by data processing system 100. Furthermore, Innovis maintains a high risk database indicating information that suggests a higher risk of fraud (for example a database of addresses that are more likely to be associated with fraud). In addition, Innovis returns an indication if an address falls in the United States Department of Treasury's Office of Foreign Assets Control (OFAC) list. The Innovis system can further return an indication of whether device information indicates fraud (e.g., return fraud detection data 524). Innovis is just one example of an identity fraud vendor.

Data application 150 processes the identity verification rules 533, determines the identity verification data 534 required to execute the identity verification rules 533, makes a call to the identity verification service (e.g., an identity fraud vendor information provider system 120), provides information from application 502 to the identity verification service, receives responsive identity verification data 534 and applies the identity verification rules 533 to the identity verification data 534. For example, according to one embodiment, data application 150 provides the consumer's name, address, email address and other information to Innovis and applies the identity verification rules 533 to the verification information 534 provided by Innovis in response. In one embodiment, hits in the non-high risk databases of Innovis can be considered positive and hits in the high risk database or OFAC list can be considered negative. For example, the rules may specify that a minimum number of positive hits are required to pass or that a maximum number of negative hits are permitted to pass. Furthermore, some hits may be considered fatal. For example, a rule can be configured such that a single hit in the high-risk address database or on the OFAC list is considered fatal. In any case, identity verification rules 533 can be tailored for the identity verification data 534 returned by one or more identity fraud vendor information provider systems 120.

If the user application 502 fails to pass identity verification rules 532, data application 150 can generate a decision result 538 indicating the reason that the application was not approved. Further, data application 150 may send a decision response to client application 114 indicating that the application was not approved and the reason the application was not approved. Client application 114 can display one or more pages indicating why the application was not approved and, in some cases, request additional information. Failure to pass identity verification rules 532 may result in any configured action, such as withholding further information or services from the consumer, requesting the consumer re-enter information or requesting that the consumer provide additional information.

Figure 6:
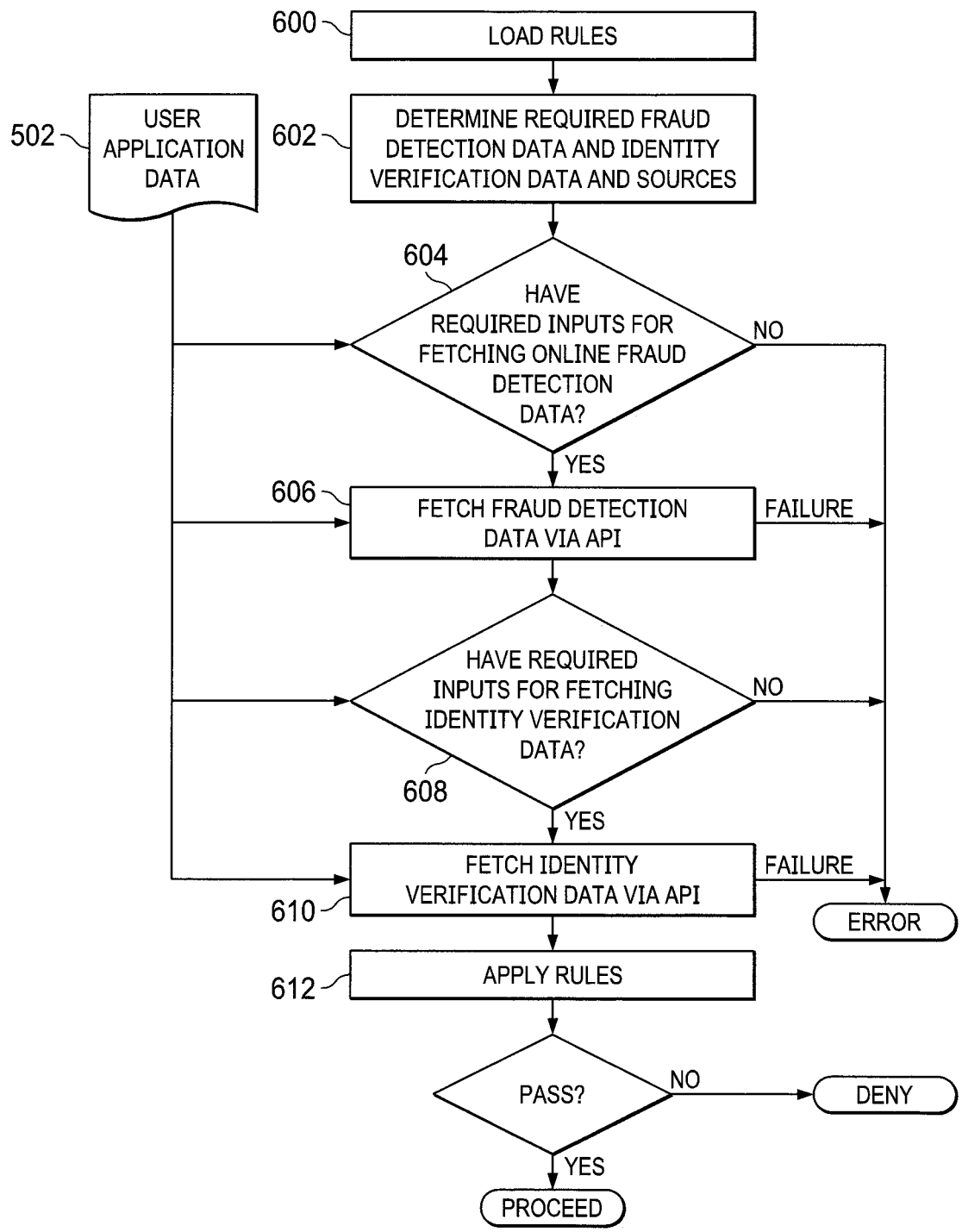
FIG. 6 is a flow chart illustrating one embodiment of a fraud detection and identity verification process.

FIG. 6 is a flow chart illustrating one embodiment of steps 522 and 532. Data application 150 can load fraud detection rules 523 and identity verification rules 533 (step 600) and determine the data from information provider systems 120 needed to execute the rules (step 602). Data application 150 can provide PII (e.g., user name, user address, user phone number, user email address, date of birth, driver's license number or other PII) from the user application record to one or more fraud detection services and identity verification services (e.g., via data vendor service 270), receive responsive fraud detection and verification signals and apply fraud rules to the information from the fraud detection and verification signals to determine whether a user or device passes fraud detection rules 523 and identity verification rules 533.

At step 604, data application 150 determines if the application includes the inputs required to fetch the fraud detection data from an information provider system 120. If not, an error can be generated. Data application 150 may generate a decision response to client application 114 to cause client application 114 to request the additional information necessary to fetch the fraud detection data.

If data application 150 has the information necessary to fetch the fraud detection data corresponding to the application, data application 150 may use the API for the service providing the fraud detection data to submit user application data and fetch the fraud detection data (step 606). As one non-limiting example, data application 150 can supply the GPS, location and device profile attributes from application 502 to the information provider system 120, receive the threatmetrix_review_status value. If the attempt to fetch the fraud detection data fails, data application 150 can generate an error. Data application 150 may generate a decision response to cause the client application to prompt the user to try again later or take another action.

At step 608, data application 150 determines if the application includes the inputs required to fetch the identity verification data from an information provider system 120. If not, an error can be generated. Data application 150 may generate a decision response to client application 114 to cause client application 114 to request the additional information necessary to fetch the identity verification data.

If data application 150 has the information necessary to fetch the identity verification data corresponding to the application, data application 150 may use the API for the service providing the identity verification data to submit application data from application 502 and fetch the fraud detection data (step 610). As one non-limiting example, data application 150 can supply PII from application 502 to retrieve an Innovis report corresponding to the consumer user. If the attempt to fetch the identity verification data fails, data application 150 can generate an error. Data application 150 may generate a decision response to cause the client application to prompt the user to try again later or take another action.

At step 612, data application can execute the fraud detection and identity verification rules on the fraud detection data and identity verification data provided by the remote systems. Fraud detection rules and identity verification rules may apply to a variety of fraud detection data and identity verification data. The following provides one example of a set of fraud detection rules and identity verification rules using the example of Innovis verification data and threatmetrix fraud detection data:

```
if (CANAME >= 1 and CANAME != 98) and
    (CAADR != 98) and
    (CAHRA == 0) and
    (CAWATCHLIST == 0) and
    (threatmetrix_review_status == 1)
    pass
else:
    fail
```

Under these rules, the consumer's name must have at least one hit in the Innovis database, but zero hits in the Innovis high risk/OFAC database, the consumer's address must have zero hits in the high risk address database and the device information must return a threatmetrix_review_status of 1 in order for a consumer to be approved.

If the application passes, the approval process proceeds. If the application does not pass the rules, data application 150 can deny the application. Data application 150 can update the application with the reason for the denial and generate a decision response to client application 114 to cause client application 114 to request additional information or terminate the approval process.

As can be seen from the foregoing examples of fraud detection rules 523 and identity verification rules 533, data application 150 may leverage information from various information provider systems 120 to verify the identity of the user or otherwise and detect fraud. The fraud detection rules may be complex and rely on data from additional or alternative source. Furthermore, data processing system 100 may include an arbitrarily complex fraud prediction model to predict if a consumer is a fraudulent user or not. Thus, one or more of device fraud detection rules 523 and identity verification rules 533 may apply rules to a fraud prediction score generated by a fraud prediction model. The fraud prediction model may rely on data from additional or alternative sources. The income predication model may comprise a machine learning model trained over sets of data and that becomes increasingly accurate with additional data or adjusts as data trends change.

The fraud prediction model can be trained over sets of data through machine learning and may become increasingly accurate with additional data. The fraud prediction model may generate a score and fraud decision rules may apply conditions to the score to approve or reject the consumer (or take other action).

A fraud prediction model may contextualize data analysis. For example, one piece of information (or combination thereof) may be analyzed differently depending on the results of analyzing another piece of information (or combination thereof). The data returned by one information provider system 120, for example, may be analyzed differently based on the results of evaluating data from another information provider system 120.

Returning to FIG. 5, at step 542 data application 150 applies credit check rules 543 to determine if the user has sufficiently good credit to be approved for financing. According to one embodiment, data application 150 may provide the user name, user address, user phone number, user email address, date of birth, driver's license number or other information from application 502 to credit reporting agency systems, which can be examples of information provider systems 120. In response, the credit reporting agency can provide a credit report 544 for a consumer. For example, Experian Information Solutions, Inc. of Costa Mesa, Calif., Equifax of Atlanta, Ga. and other credit reporting agencies provide online systems through which credit reports can be pulled. In addition to providing a FICO score, a credit report 544 can provide status codes indicating various types of events such bankruptcies, delinquent accounts, repossessions, foreclosures, etc. across accounts. According to one embodiment, all the credit pulls performed in the approval process are soft pulls.

The credit check rules 543 may apply to one or more the credit score and status codes returned by the credit reporting agencies. Moreover, credit check rules 543 may reference a credit risk score 546 generated by a credit risk prediction model. The credit risk prediction model may generate a credit risk score and credit check rules 543 may apply conditions to the score to approve or reject the application 502 (or take other action). The credit risk score may be, for example, a score that predicts the risk of default.

If the user application 502 fails to pass credit check rules 543, data application 150 can generate a decision result 548 indicating the reason that the application was not approved. Further, data application 150 may send a decision response to client application 114 indicating that the application was not approved and the reason the application was not approved. Client application 114 can display one or more pages indicating why the application was not approved and, in some cases, request additional information. Failure to pass credit check rules 543 may result in any configured action, such as withholding further information or services from the consumer, requesting the consumer re-enter information or requesting that the consumer provide additional information.

Figure 7:
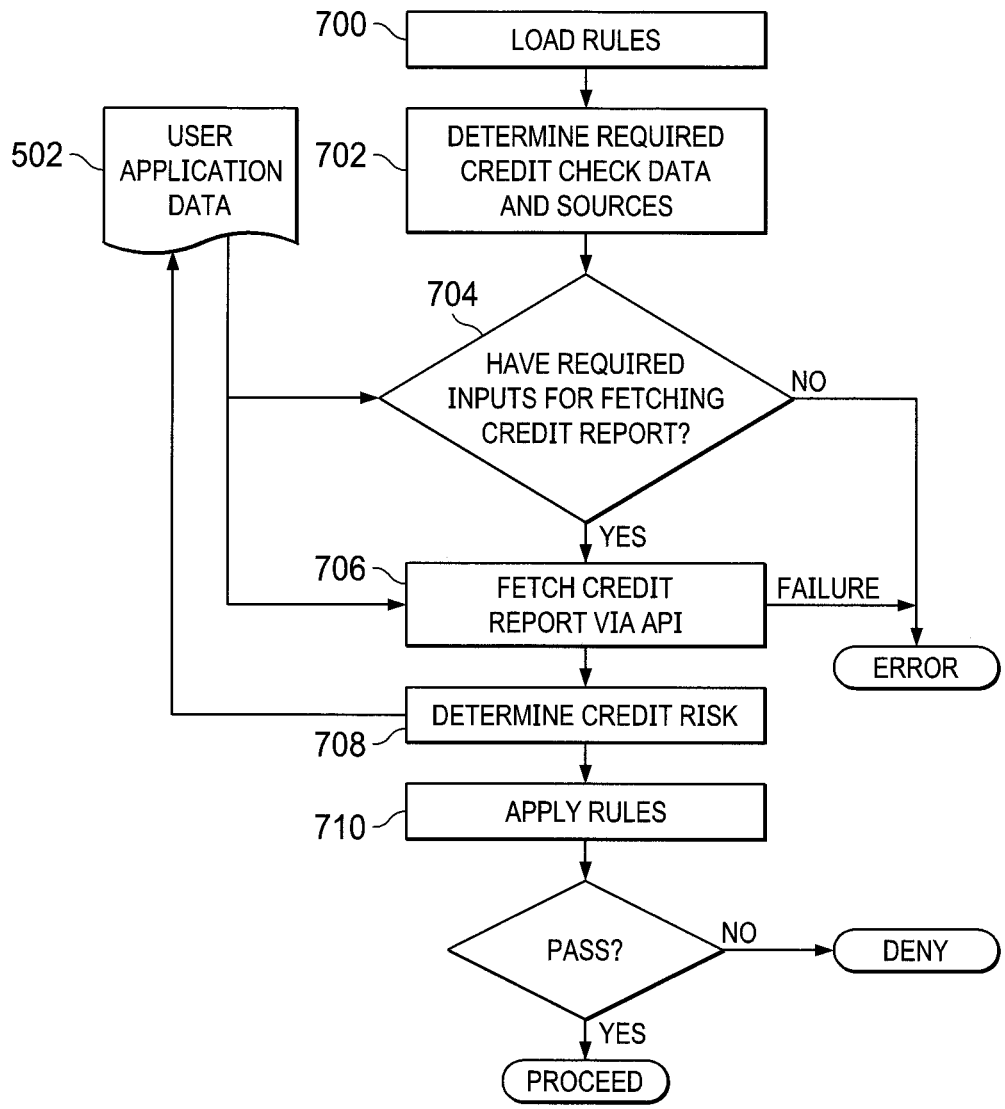
FIG. 7 is a flow chart illustrating one embodiment of a credit check process.

FIG. 7 is a flow chart illustrating one embodiment of a credit check process (step 542). Data application 150 can load credit check rules 523 (step 700) and determine the data from information provider systems 120 needed to execute the rules (step 702). This may include determining any data required by a credit risk prediction model. At step 704, data application 150 determines if the application 502 includes the inputs required to fetch a credit report (or other credit check data) from an information provider system 120, such as a credit reporting agency, or cache. If not, an error can be generated. Data application 150 may generate a decision response to client application 114 to cause client application 114 to request the additional information necessary to fetch the credit report.

If data application 150 has the information necessary to fetch the credit report corresponding to the application 502, data application 150 may fetch the credit report from cache (if available and not stale) or use the API for the credit reporting agency to submit user application data, such as PII, and fetch the credit report (step 706). If a failure occurs while pulling the credit report, data application 150 may generate an error.

At step 708, data application 150 applies the credit risk prediction model to determine a credit risk score. The credit risk score for the consumer may be added to application 502. According to one embodiment, the credit risk prediction model may comprise a set of rules that categorize a user into at least one of any number of credit risk bands. In particular, a credit risk prediction model may use information returned in credit report 544 to categorize a user into a credit risk band. For example, a credit risk prediction model may be a set of rules to categorize a user into one of n credit risk bands, where n=20 in the below example, such as:

If FICO 700-710 then credit risk=19
IF FICO 711-720 then credit risk=18
IF FICO 721-730 then credit risk=17
IF FICO 731-740 then credit risk=16
* * *
IF FICO 890-900 then credit risk=0

While, in the above example, the credit risk prediction model comprises a limited set of rules, the credit risk prediction model may be arbitrarily complex and rely on data from additional or alternative sources. The credit risk predication model may comprise a machine learning model trained over sets of data and that becomes increasingly accurate with additional data or adjusts as data trends change.

A credit risk prediction model may contextualize data analysis. For example, one piece of information (or combination thereof) may be analyzed differently depending on the results of analyzing another piece of information (or combination thereof) (e.g., the number of allowable delinquent accounts may be higher if the user's FICO is higher). The data returned by one information provider system 120 (e.g., returned by one credit reporting agency), for example, may be analyzed differently based on the results of evaluating data from another information provider system 120 (e.g., returned by another credit reporting agency).

At step 710, data application 150 can apply the credit check rules to the credit report or credit risk score. The following provides one example of credit check rules.

```
If:
    FICO>=700 and
    Repossessions=0 and
        Bankruptcies=0 and
    Delinquent Accounts=0
        Pass
Else:
        Fail
```

In the foregoing example, the credit check rules directly apply to data from a credit report. In other embodiments, credit check rules may apply conditions to a credit risk score to determine if an application 502 passes the credit check rules. The credit check rules may be complex and rely on data from additional or alternative sources. Failing the credit check rules may result in requesting more information from the user or taking other configured actions.

Returning to FIG. 5, if the application passes credit check step 542, the approval process proceeds. If the application does not pass the credit check rules, data application 150 can deny the application. Data application 150 can update the application 502 with the reason for the denial and generate a decision response to client application 114 to cause client application 114 to request additional information or terminate the approval process.

Returning to FIG. 5, at step 552, data application 150 determines a verified income for the consumer based on application 502 and leveraging information from distributed sources. Data application 150 can interact with one or more financial institutions, credit reporting agencies, income estimation services (which can be examples of information provider systems 120) or other information to collect information about a user's income and debts to verify income and determine affordability. Data processing system 100 may perform one or more income tests to ensure that a consumer meets minimum income qualifications. As noted above, some of these tests may be performed as part of initial checks 512. Data application 150 may further apply income verification rules 553 to determine a verified income (represented in the below examples as verified_monthly_income) for the user.

Income verification rules 553, according to one embodiment, may reference an income prediction model that generates a predicted income 556. In accordance with one embodiment, data application collects self-reported income from a consumer, predicts the consumer's income based on information provided by information provider systems 120 and applies rules/models to the self-reported income and predicted income to determine a verified income.

If there is insufficient application data to determine a verified income, data application 150 may generate a decision result 558 indicating that the application was not approved. Furthermore, data application 150 may send a decision response to client application 114 indicating that the application was not approved and the reason the application was not approved. Client application 114 can display one or more pages indicating why the application was not approved and, in some cases, request additional information.

Figure 8:
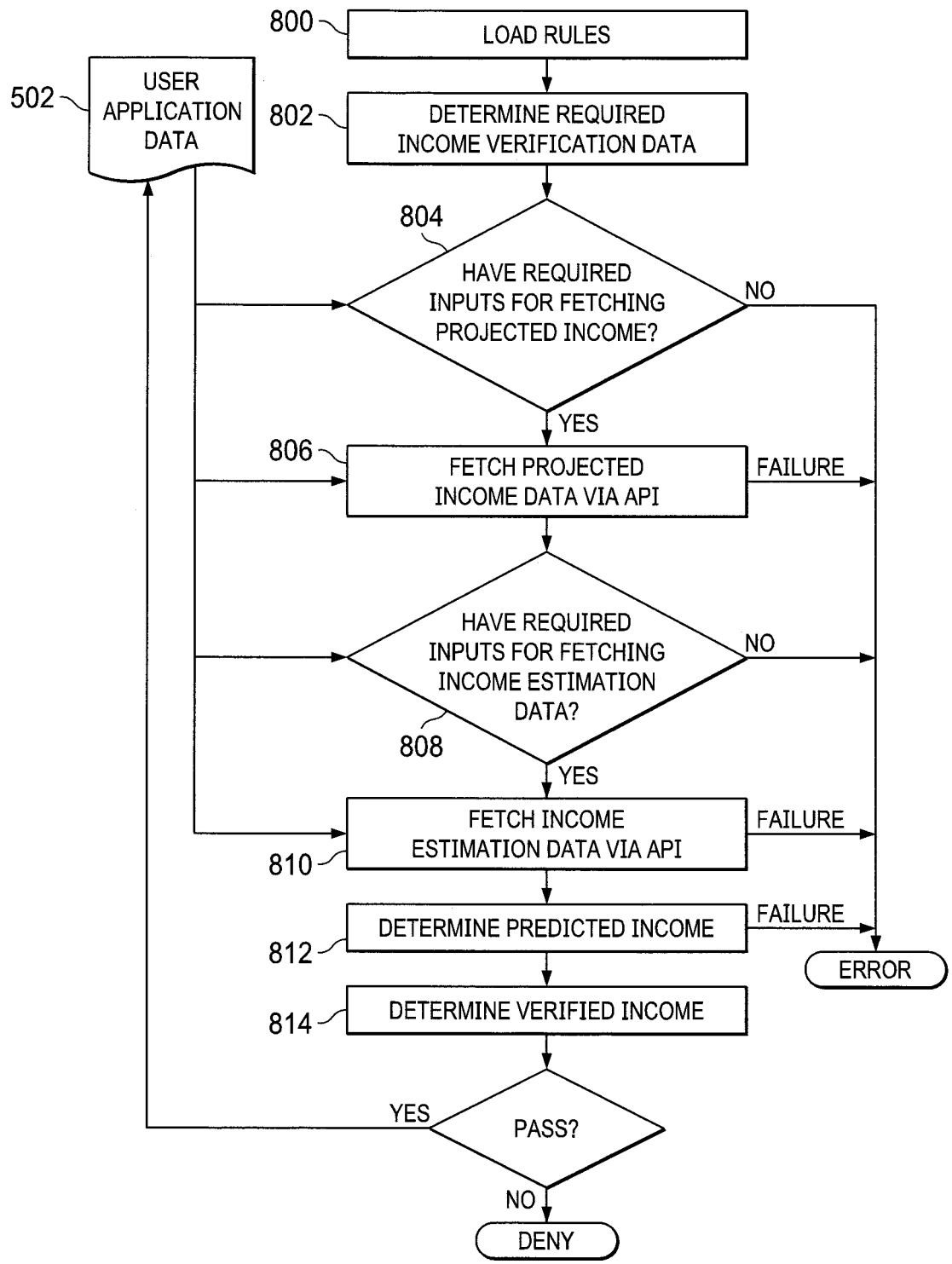
FIG. 8 is a flow chart illustrating one embodiment of an income verification process.
Figure 9A:
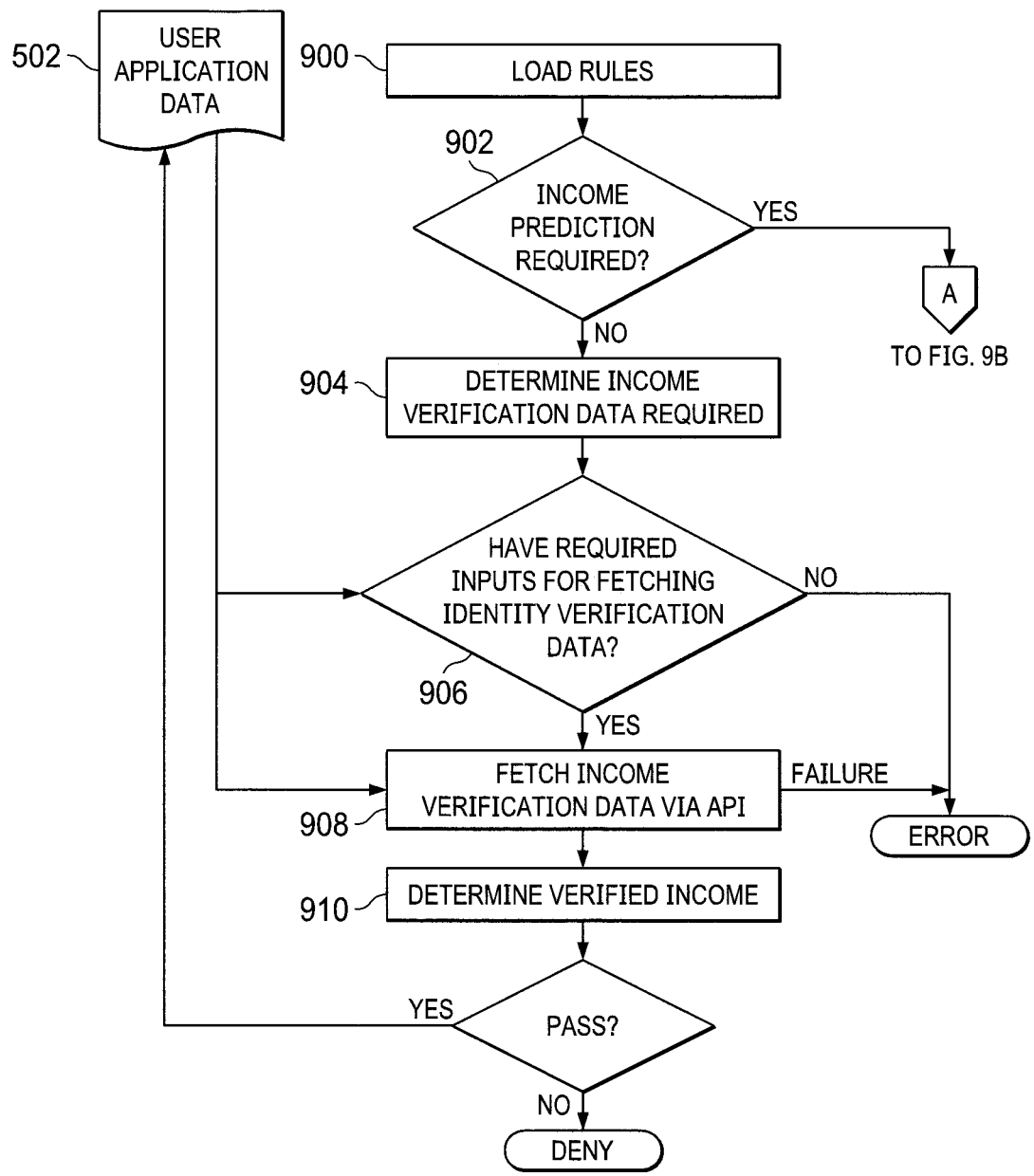
FIG. 9A and FIG. 9B are flow charts illustrating another embodiment of an income verification process.
Figure 9B:
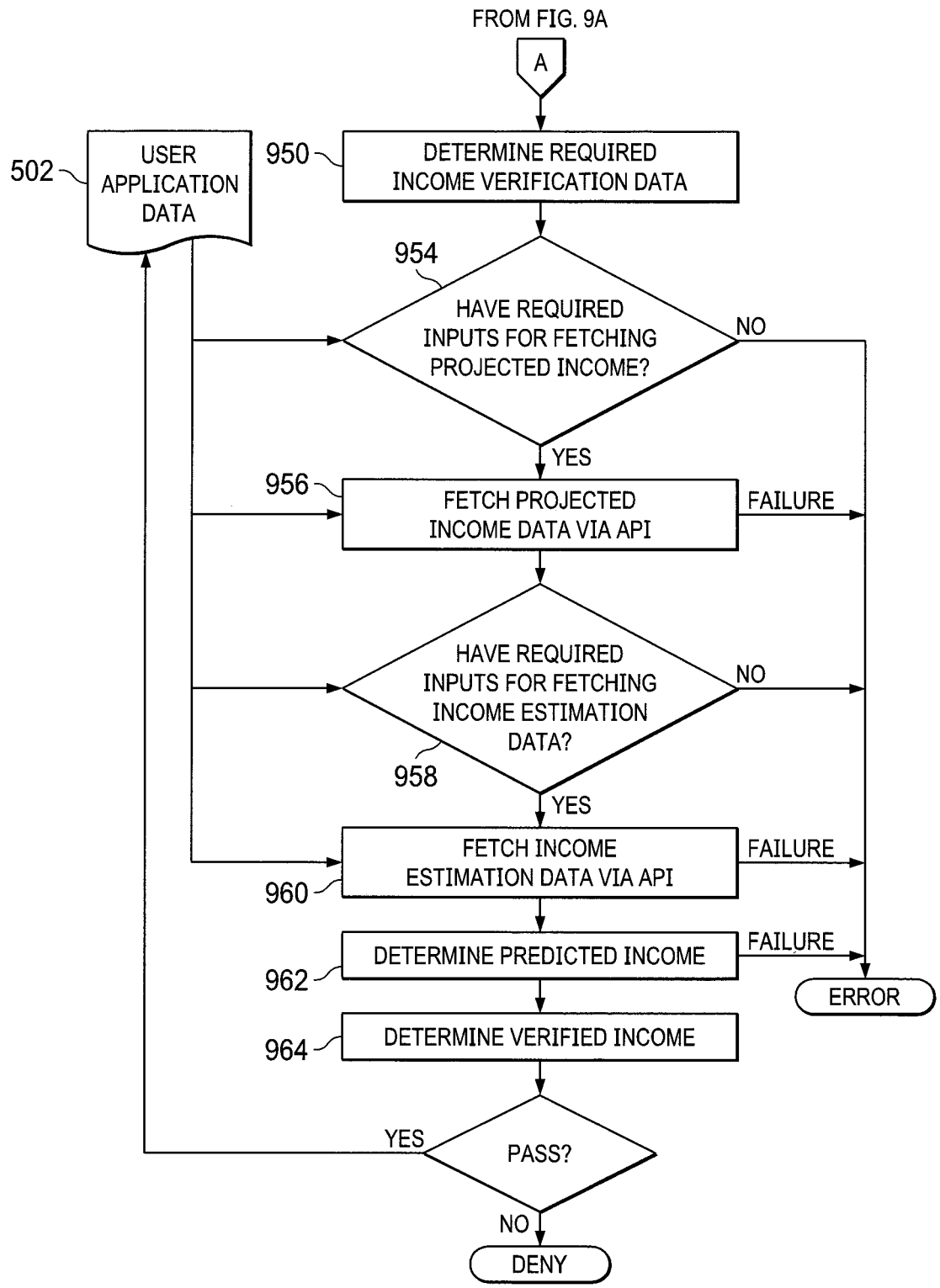

FIG. 8, FIG. 9A and FIG. 9B (FIGS. 9A and 9B are referred to collectively herein as FIG. 9) illustrate example embodiments of income verification (step 552). In these examples, the verified income is determined based on one or more of the self-reported income, an estimated income provided by an income estimation service, a projected income determined from actual financial transactions by the user, and a predicted income generated based on an income prediction model. In this context:

1) estimated income (estimated_income_score) is an income value estimated based on secondary sources of financial information, such as credit reports and other sources of data without requiring access the user's financial accounts. In some embodiments, the information used to determine estimated income may be requested from an information provider system 120 and data application 150 may estimate the income. In another embodiment, the information provider system 120 (e.g., an income estimation service) may provide the estimated income. For example, Transunion, Inc. of Chicago, Ill., provides income estimation modeling and provides a CreditVision score, which can be used as one example of estimated income (e.g., estimated_income=credit_vision_income_score). As such, data application 150 can provide information from the application 502 to TransUnion (or other provider) via an API and receive credit information, including a CreditVision score (or other estimated income measure) in response.

2) projected income (projected_income) is an income value projected from analyzing transactions in the consumer's financial account(s). The projected income may be determined by accessing the consumer's bank account and reviewing the transaction records to identify patterns that suggest an income (e.g., deposits occurring on a regular schedule). In some cases, the projected income may be provided by an information provider system 120. For example, Plaid Technologies, Inc. of San Francisco, Calif. provides an API that allows an application (e.g., data application 150) to access user bank accounts and retrieve transaction information and projected income data. Thus, for example, data application 150 may connect to a user's bank account using information from application 502 (e.g., credentials provided by or derived for the user, such as a Plaid token) and collect transaction data and projected income using the Plaid service (e.g., projected_income=plaid_income) or other service.

An income prediction model may use self-reported income, an estimated income, a projected income or other data to determine a predicted income (represented as model_income below). In particular, one embodiment of the income prediction model determines a predicted monthly income (model_income) based on:

1) a projected income score determined from the user's bank account (e.g., the projected_income);
2) an estimated income score determined from an income estimation service (e.g., the estimated_income);
3) high and low income estimations based on the estimated income score determined from the income estimation service.

In one embodiment, the income prediction model determines the predicted income as follows:

```
if estimated_income_low <= projected_income <=
estimated_income_high:
    if estimated_income <= 0:
        model_income=0
    else:
        model_income=projected_income
else:
    model_income=estimated_income
```

The high and low and high income estimations provided can be estimated incomes provided by an income estimation service scaled by a scaling factor (e.g., credit_vision_income_low=credit_vision_income_score*0.9 and credit_vision_income_high=credit_vision_income_score*1.1). The scaling factor may be set by rules, interpolated from the income estimation data (e.g., CreditVision data) or be otherwise determined. In one embodiment, for example, the scaling factors correspond to the standard deviation of CreditVision scores, e.g.:

```
credit_vision_income_low, credit_vision_income_high
=get_TU_income_sigma(credit_vision_income_score)
```

According to another example embodiment, the income prediction model determines the predicted income based on the estimated income, projected income and an projected income confidence level determined based on financial transactions associated with the user's bank account specified in the application data 502. Using the example of a Plaid projected income and Plaid confidence level, the predicted income 556 can be determined as follows:

```
if projected_income_confidence > c
    model_income = projected_income
else
    model_income = estimated_income
where projected_income_confidence is a confidence
measure of the income projection. The confidence
measure can be determined by data processing
system 100 or by the income projection service.
For example, Plaid provides not only a
plaid_income, but also a plaid_confidence,
which can be used as projected_income_confidence
in one embodiment. 'c' is a confidence level
threshold configured in data processing system 100.
Preferably 'c' is >.7 and more preferably .9 or greater.
```

The income prediction model may be configured to favor projected income over estimated income because the projected income is directly based on actual bank account records of the consumer. However, a substantial variation between the projected income and estimated income or a low confidence in the projected income may indicate that the consumer provided information for a non-primary bank account, the user's financial circumstances have changed (e.g., a raised or reduced income not reflected in the estimated income) or other event has occurred. Therefore, in accordance with one embodiment, the projected income is only used as the predicted income if the projected income is within a statistical range of the estimated income, say one standard deviation, or above a confidence threshold. The statistical range or confidence threshold may be selected based, for example, on business rules or a machine learning model.

While, in the above examples, the income prediction models comprise a limited set of rules, the income prediction models may be arbitrarily complex and rely on data from additional or alternative sources. The income predication model may comprise a machine learning model trained over sets of data and that becomes increasingly accurate with additional data or adjusts as data trends change.

An income prediction model may contextualize data analysis. For example, one piece of information (or combination thereof) may be analyzed differently depending on the results of analyzing another piece of information (or combination thereof). The data returned by one information provider system 120 may be analyzed differently based on the results of evaluating data from another information provider system 120.

With respect to FIG. 8, data application 150 can load income verification rules 553 (step 800) and determine the data from information provider systems 120 needed to execute the rules (step 802). This may include determining any data required by an income prediction model. For example, if the verified income rule specifies:

> verified_monthly_income=min(monthly_self_reported_income, model_income)

data application 150 will fetch the data required by the prediction model to determine model_income. Using the above examples of rules-based income prediction models in which the estimated income is a CreditVision score and the projected income is provided by Plaid, data application 150 will determine that a Plaid report and a TransUnion credit report that includes a CreditVision score are required.

Data application 150 can provide PII (e.g., user name, user address, user phone number, user email address, date of birth, driver's license number or other PII, financial institution information, such as a Plaid token, or other information) from the application to one or more income projection services and income estimation services, receive responsive income verification data, and apply an income prediction model and income verification rules to income verification data to determine a verified income.

At step 804, data application 150 determines if the application includes the inputs required to fetch the projected income data from an information provider system 120 or cache (e.g., fetch a Plaid report for the user). If not, an error can be generated. Data application 150 may generate a decision response to client application 114 to cause client application 114 to request the additional information necessary to fetch the projected income data.

If data application 150 has the information necessary to fetch the projected income data, data application 150 can fetch the data from cache (if available and not stale) or use the API for the service providing the projected income data to submit user application data and fetch the projected income data (step 806). As one non-limiting example, data application 150 can supply a Plaid token to the Plaid service and request a Plaid report associated with the token. If the attempt to fetch the projected income data fails, data application 150 can generate an error. Data application 150 may generate a decision response to cause the client application to prompt the user to try again later or take another action.

At step 808, data application 150 determines if the application includes the inputs required to fetch the income estimation data from an information provider system 120 or cache. If not, an error can be generated. Data application 150 may generate a decision response to client application 114 to cause client application 114 to request the additional information necessary to fetch the income estimation data.

If data application 150 has the information necessary to fetch the income estimation data corresponding to the application 502, data application 150 may fetch the data from cache (if available) or use the API for the service providing the income estimation data to submit application data from application 502 and fetch the income estimation data (step 810). As one non-limiting example, data application 150 can supply PII from application 502 to retrieve a TransUnion credit report containing a CreditVision score for the user. If the attempt to fetch the income estimation data fails, data application 150 can generate an error. Data application 150 may generate a decision response to cause the client application to prompt the user to try again later or take another action.

At step 812, data application 150 can apply an income prediction model to generate a predicted monthly income (model_income). If an error occurs, data application 150 may generate a decision response to client application 114 to cause client application 114 to request the additional information necessary to fetch the income estimation data. At step 814, data application 150 applies the income verification rules 553 to generate a verified income using one or more of the estimated income, projected income or predicted income.

The income verification rules 553 may further include conditions applied to the verified income. For example, rules may specify a threshold verified income, for example:

> If:
>     verified_monthly_income > income_threshold
>     Pass
> Else:
>     Fail
> where income_threshold is a configurable monthly income threshold, say $3000 or other threshold.

If the application passes the additional verified income checks, if any, the verified income can be added to application 502 and the approval process proceeds. If the application does not pass, data application 150 can deny the application. Data application 150 can update the application 502 with the reason for the denial and generate a decision response to client application 114 to cause client application 114 to request additional information or terminate the approval process.

With respect to FIG. 9, data application 150 can load income verification rules 553 (step 900). In the embodiment of FIG. 9, the income verification rules may specify conditions under which an income prediction is required. For example, verification rules 553 may specify that an income prediction is required if the user failed to pass identity verification step 532 or some other condition is met with respect to the application 502. At step 902, data application 150 determines whether an income prediction is required. If an income prediction is not required, the method proceeds to step 904. Otherwise, the method proceeds to step 950.

At step 904, data application 150 can select a first set of income verification rules that do not require an income prediction and determine the data from information provider systems 120 needed to execute the rules. As an example, a first set of income verification rules may be:

> if self_reported_income < estimated_income
>     return self_reported_income
> else if self > estimated_income * y
>     return estimated_income *y
> else
>     use average(self_reported_income, estimated_income)
> where 'y' can be configured in the rules. In this example, 'y' may be selected based on any number of considerations. According to one embodiment, 'y' may be from 1-3. For example, 'y' may be 1.5, 1.75, 2.0 or other factor. In any event, these example rules do not require determining a predicted income, but uses the self-reported income from application 502 and an estimated_income from an income estimation service.

Continuing with step 904, data application 150 can determine that an estimated income is required. Using the example in which the estimated income is a CreditVision score, data application 150 can determine that a TransUnion credit report that includes a CreditVision score are required.

Data application 150 will fetch the data required by the income verification rules 553. Using the above examples, data application can fetch an estimated income score from an information provider system 120 or cache (if available). Data application 150 can provide PII (e.g., user name, user address, user phone number, user email address, date of birth, driver's license number or other PII, financial institution information) to income estimation services, receive responsive income verification data, and apply the income verification rules to income verification data to determine a verified income.

At step 906, data application 150 determines if the application 502 includes the inputs required to fetch the income verification data from cache or an information provider system 120. If not, an error can be generated. Data application 150 may generate a decision response to client application 114 to cause client application 114 to request the additional information necessary to fetch the projected income data.

If data application 150 has the information necessary to fetch the income verification data, data application 150 fetch the data from cache (if available and not stale) or use the API for the service providing the income verification data to submit user application data and fetch the income verification data (step 908). As one non-limiting example, data application 150 can supply PII from application 502 to retrieve a TransUnion credit report containing a CreditVision score for the user. If the attempt to fetch the income verification data fails, data application 150 can generate an error. Data application 150 may generate a decision response to cause the client application to prompt the user to try again later or take another action.

At step 910, data application 150 applies the income verification rules 553 to generate a verified income using one or more of the estimated income, projected income or self-reported income. The verified income can be added to application 502.

If the application passes the additional verified income checks, if any, the verified income can be added to application and the approval process proceeds. If the application does not pass, data application 150 can deny the application. Data application 150 can update the application 502 with the reason for the denial and generate a decision response to client application 114 to cause client application 114 to request additional information or terminate the approval process.

Turning to FIG. 9B, data application 150 can determine a second set of income prediction rules and determine the data from information provider systems 120 needed to execute the rules (step 950). This may include determining any data required by an income prediction model. As an example, a set of income verification rules may specify:

```
if estimated_income < model_income:
    use self_reported_income
else if self_reported_income > z * model_income
    use model_income * z
else
    use average(self_reported_income, model_income)
where 'z' is configured in the rules. In the foregoing example,
'z' may be selected based on any number of considerations, 'z',
according to one embodiment, is 1-2 (e.g., 1.25, 1.5, 1.75, 2 or other
number). From these rules, data application 150 can determine that a
model_income is required. Using the above examples of rules-based
income prediction models, the CreditVision score as the
estimated_income and the plaid_income as the projected_income,
data application 150 will determine that a Plaid report and a
TransUnion credit report with a CreditVision score are required.
```

Data application 150 can provide PII (e.g., user name, user address, user phone number, user email address, date of birth, driver's license number or other PII, financial institution information, such as a Plaid token, or other information) from the application to one or more income projection services and income estimation services, receive responsive income verification data, and apply an income prediction model and income verification rules to income verification data to determine a verified income.

At step 954, data application 150 determines if the application 502 includes the inputs required to fetch the projected income data from cache or an information provider system 120 (e.g., fetch a Plaid report for the user). If not, an error can be generated. Data application 150 may generate a decision response to client application 114 to cause client application 114 to request the additional information necessary to fetch the projected income data.

If data application 150 has the information necessary to fetch the projected income data, data application 150 can fetch the data from cache (if available and not stale) or use the API for the service providing the projected income data to submit user application data and fetch the projected income data (step 956). As one non-limiting example, data application 150 can supply a Plaid token to the Plaid service and request a Plaid report associated with the token. If the attempt to fetch the projected income data fails, data application 150 can generate an error. Data application 150 may generate a decision response to cause the client application to prompt the user to try again later or take another action.

At step 958, data application 150 determines if the application includes the inputs required to fetch the income estimation data from cache or an information provider system 120. If not, an error can be generated. Data application 150 may generate a decision response to client application 114 to cause client application 114 to request the additional information necessary to fetch the income estimation data.

If data application 150 has the information necessary to fetch the income estimation data corresponding to the application 502, data application 150 may fetch the data from cache (if available and not stale) or use the API for the service providing the income estimation data to submit application data from application 502 and fetch the income estimation data (step 960). As one non-limiting example, data application 150 can supply PII from application 502 to retrieve a TransUnion credit report containing a CreditVision score for the user. If the attempt to fetch the income estimation data fails, data application 150 can generate an error. Data application 150 may generate a decision response to cause the client application to prompt the user to try again later or take another action.

At step 962, data application 150 can apply an income prediction model to generate a predicted monthly income (model_income). If an error occurs, data application 150 may generate a decision response to client application 114 to cause client application 114 to request the additional information necessary to fetch the income estimation data. At step 964, data application 150 applies the income verification rules 553 to generate a verified income using one or more of the estimated income, projected income or predicted income.

If the application passes the additional verified income checks, if any, the verified income can be added to application and the approval process proceeds. If the application does not pass, data application 150 can deny the application. Data application 150 can update the application 502 with the reason for the denial and generate a decision response to client application 114 to cause client application 114 to request additional information or terminate the approval process.

The embodiment of FIG. 9 provides the advantage that some users are not required to supply bank account login information or detailed financial transaction data to verify income. For example, if a user's application proceeds to step 904, the user is not required to provide information such as illustrated in FIG. 4G and FIG. 4H to verify income. However, if a user's application proceeds to step 950, the user may be required to provide bank account login information or detailed financial transaction data to verify income.

As can be seen from the foregoing examples of income verification rules and income prediction models, data application 150 may leverage information from various information provider systems 120 to determine a verified income for the user. While specific examples are provided for understanding, the income verification rules may be complex and rely on data from additional or alternative sources.

Returning to FIG. 5, at step 562 data application 150 applies affordability rules 563 to determine an affordability score based on a consumer's ability to afford monthly (or other periodic) payments. According to one aspect of the present disclosure, the computer system may facilitate efficient financing approval by approving financing based on the consumer's ability to afford a periodic obligation (e.g., monthly payment) rather than on LTV. The computer system can apply rules/models (including, in some embodiments, machine learning models) to the consumer's financial data to determine an affordability score that determines a periodic payment that an intermediary (financing provider) will approve for the consumer.

Data application 150 can interact with one or more financial institutions, credit reporting agencies, income estimation services (which can be examples of information provider systems 120) or other information to collect information about a user's income and debts to verify income and determine affordability. Data processing system 100 may perform one or more income tests to ensure that a consumer meets minimum income qualifications.

In determining affordability, data application 150 can interact with one or more financial institutions, credit reporting agencies, income estimation services (which can be examples of information provider systems 120) or other information to collect information about a user's income and debts to verify income and determine affordability.

Embodiments of data processing system 100 can determine affordability without relying on LTV. In general, the affordability evaluation can use income and debt information for the consumer to determine how large of a monthly payment the user can afford. The affordability score thus provides a prediction of the amount that the consumer can fairly pay to underwrite a loan on a monthly (or other periodic) basis. The monthly payment determined by the affordability decision may be scaled based on debt obligation.

In accordance with one embodiment, affordability may be based on income, debt-to-income ratio (DTI), payment-to-income ratio (PTI) and other factors. In general, the affordability score determination can be used to determine a maximum monthly payment that does not exceed a maximum PTI and when added to the consumer's current obligations does not cause the obligations do not exceed a maximum DTI. The maximum DTI and PTI may be set by rules, through modeling or through other mechanism.

As part of determining a fair affordable monthly payment, the rules or model used to determine affordability may take into account additional costs associated with a purchased asset. For example, if a consumer is purchasing a vehicle, the affordability score may be calculated to leave room in the consumer's monthly budget for items such as gas and regular maintenance and thus the affordable monthly payment determined for the consumer can be selected to allow the consumer to underwrite the loan while paying for other expected costs associated with the vehicle (e.g., insurance, maintenance, gas).

In accordance with one embodiment then, data application 150 applies affordability rules 563 to predict the monthly payment a consumer can afford from information provided by information provider systems 120. Thus, the affordability determination can be used to determine that the consumer can pay a maximum of $X a month. As discussed below, this value can be used to filter inventory items such that the user can only purchase items within his or her affordability.

If there is insufficient application data to determine an affordability score, data application 150 may generate a decision result 568 indicating that the application was not approved. Furthermore, data application 150 may send a decision response to client application 114 indicating that the application was not approved and the reason the application was not approved. Client application 114 can display one or more pages indicating why the application was not approved and, in some cases, request additional information.

FIG. 10 is a flow chart illustrating one embodiment of an affordability determination (step 562). Data application 150 can load affordability rules 563 (step 1000) and determine the affordability data from information provider systems 120 needed to execute the rules (step 1002). This may include determining any data required by an income prediction model.

The affordability determination may rely on credit reports from one or more credit reporting agencies. Thus, data application 150 can be configured to fetch credit report data for a user. As discussed above, a credit report may already have been fetched (e.g., in the credit check or income verification steps). Thus, data application 150 may fetch the credit report from cache. In other embodiments, data application 150 can provide PII (e.g., user name, user address, user phone number, user email address, date of birth, driver's license number or other PII, financial institution information or other information) to one or more credit reporting agencies, receive responsive income verification data, and apply an income prediction model and income verification rules to income verification data to determine a verified income.

At step 1004, data application 150 determines if the application 502 includes the inputs required to fetch a credit report (or other credit check data) from an information provider system 120 or cache, such as a credit reporting agency. If not, an error can be generated. Data application 150 may generate a decision response to client application 114 to cause client application 114 to request the additional information necessary to fetch the credit report.

If data application 150 has the information necessary to fetch the credit report corresponding to the application 502, data application 150 may use the API for the credit reporting agency to submit user application data, such as PII, and fetch the credit report (step 1006). If a failure occurs when pulling the credit report, data application 150 may generate an error.

At step 1008, data application 150 determines a debt-to-income ratio based on the credit report and verified_monthly_income associated with the application 502. According to one embodiment, a monthly debt obligation can be determined from a credit report for the user. One example of pseudo-code for determining a monthly debt obligation (monthly_debt_obligations) from a credit report is illustrated in FIG. 11, though other methods may be used.

At step 1010, data application 150 determines a debt-to-income ratio (DTI) for the user. For example, according to one embodiment, DTI can be determined as follows:

> current_dti_ratio=monthly_debt_obligations/
> verified_monthly_income

At step 1012, data application 150 applies the affordability rules to determine an affordability score the user (maximum_monthly_payment). According to one embodiment, that maximum monthly payment can be determined as follows:

--- non_adjusted_max_payment = min(verified_monthly_income * maximum_pti, fair_maximum_monthly_payment_cents)
if ((non_adjusted_max_payment + monthly_debt_obligations) / verified_monthly_income) > maximum_dti:
    maximum_monthly_payment = (maximum_dti – current_dti_ratio) *
verified_monthly_income
else:
    maximum_monthly_payment = non_adjusted_max_payment
where:
    maximum_PTI is the maximum payment-to-income ratio set for data processing system;
    fair_maximum_monthly_payment_cents is a maximum allowable monthly payment set for the data processing system;
maximum_dti is the maximum DTI permitted by the data processing system.
In some embodiments, the maximum DTI can be set based on verified statistics, such as those provided by the Bureau of Labor Statistics number on how much individuals pay for personal transportation. If, the maximum DTI will not be exceeded when the non_adjusted_max_payment is added to the consumer's obligations, then the maximum payment for the consumer can be set to the non_adjusted_max_payment.

---

Data application 150 may further determine a suggested affordability score. In one embodiment, for example, a suggested monthly payment can be determined based on, for example, a suggested PTI:

--- suggested_monthly_payment = min(verified_monthly_income * suggested_pti, maximum_monthly_payment)
where suggested_pti is a suggested PTI set in the data application 150.

---

The affordability score may allow the intermediary to loan more than the value of an underlying item being purchased (e.g., a vehicle or other item) can back. For example, based on the affordability score, the intermediary may provide funding to allow a consumer to purchase a vehicle in combination with products that cannot be used as security, such as maintenance contracts, warranties, fuel contracts, etc. Thus, the loan may only be partially secured by an asset, such as a vehicle.

According to one embodiment, data processing system 100 can use information from information provider systems 120 to determine the consumer's DTI based on the consumer's monthly debt obligation and income (e.g., verified income). The monthly debt obligation for a consumer can be determined by, for example, analyzing the consumer's credit report, such as credit report data provided by TransUnion or other credit reporting agency.

In some embodiments, data processing system 100 may include an affordability model configured to set an upper limit on the user's affordability. The affordability model can be trained over sets of data through machine learning and may become increasingly accurate with additional data. The affordability model may contextualize data analysis. For example, one piece of information (or combination thereof) may be analyzed differently depending on the results of analyzing another piece of information (or combination thereof). The data returned by one information provider system 120, for example, may be analyzed differently based on the results of evaluating data from another information provider system 120.

In any event, the intermediary may enter into a contract with the consumer to finance purchasing of goods and services based on the affordability score. In accordance with one embodiment, the intermediary may contract to finance the purchase of illiquid assets or other assets that can be used for security in combination with other goods or services up the an amount such that the consumer's monthly debt obligation under the contract will not exceed the maximum monthly payment, and more preferably, will not exceed the suggested monthly payment, as determined from the affordability analysis. For example, the intermediary may finance the purchase of a vehicle in combination with the purchase of a maintenance contract or warranty. In this example, the value of the vehicle may act as security for a portion of the debt obligation to the intermediary.

As discussed above, embodiments described herein can provide a low friction interface for registration and loan approval. Various steps of the approval process discussed above can be implemented to minimize the amount of time required for approval. For example, data processing system 100 may request information from the various information provider systems 120 simultaneously, thus avoiding the need to wait between each step to obtain information from systems 120 for subsequent steps.

Furthermore, embodiments described herein eliminate much of the delay often associated with seeking financing. Part of the delay introduced by financing stems from the methods by which conventional loans are approved. Conventionally, loan providers use an LTV (ratio of the loan to the value of the asset purchased) to approve loans for illiquid assets (or other assets that can act as security). Generally, the value of the asset must be sufficient to secure the entire loan even if the purchase includes items that cannot be secured (e.g., service contracts). As such, the loan approval process requires that a consumer know, prior to applying for financing, the value of the asset being purchased, its price, and their down payment or cap cost reduction. Consequently, financing often does not happen until a consumer and seller agree on a price and down payment/cap cost reduction for an asset (e.g., a consumer and dealer agree on a price for a specific car). Data processing system 100 on the other hand does not require knowledge of which vehicle the user will purchase to approve financing because data processing system 100 can generate an affordability score without using LTV.

Figure 12:
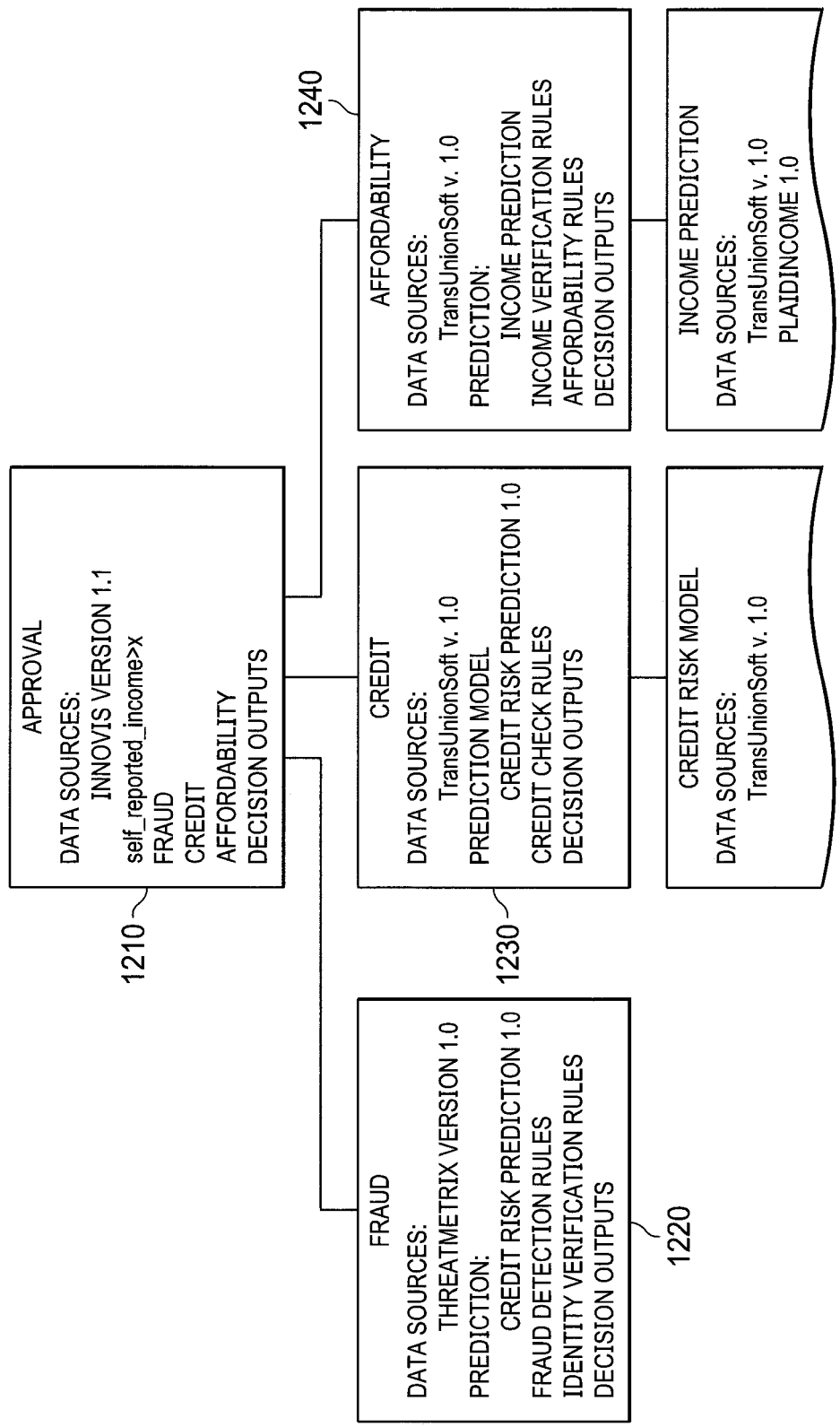
FIG. 12 is a diagrammatic representation of a set of decisions and prediction models according to one embodiment.

As discussed above, the approval rules 140 (e.g., fraud detection rules 523, identity verification rules 533, credit check rules 543, income verification rules 553 and affordability rules 563) may be implemented as decisions executed by decision service 250. FIG. 12 is a diagrammatic representation of a set of decisions and prediction models according to one embodiment.

In the embodiment depicted, the decision service 250 can execute an approval decision 1210, a fraud decision 1220, a credit check decision 1230 and an affordability decision 1240. The decision service may receive a call to execute any of the decisions. However, a decision may reference one or more sub-decisions. For example, approval decision 1210 references fraud decision 1220, credit decision 1230 and affordability decision 1240. A decision may contain rules applicable to the results of the sub-decisions.

In response to a request for an approval decision (e.g., from user application service 210), the decision service can process the tree beginning at the node for the requested decision and including the sub-decisions, through n number of levels of decisions. Using the example of FIG. 12, the decision service 250, responsive to a request for an approval decision, may execute the sub-decisions in the order that they are referenced in the approval decision. According to one embodiment, decision service 200 traverses the tree in a depth-first fashion.

A decision may include a set of decision rules. The decision rules may apply conditions to input data from a user application, the output of a sub-decision, a prediction from a prediction model or data from a data source. For example, approval decision 1210 may include initial checks and a rule that requires an application to pass each sub-decision to pass the approval decision. Fraud decision 1220, in the embodiment illustrated includes fraud detection rules and identity verification rules, credit decision 1230 includes credit check rules and affordability decision 1240 includes income verification rules and affordability rules. A decision may also specify the decision outputs, for example, decline codes that are output or scores that are passed.

As discussed earlier, a decision may reference a data source defined by decision service 250. For example, fraud decision 1220 references a data source for Threatmetrix data. In addition, the decisions may reference prediction models. For example, credit decision 1230 references a credit risk prediction and affordability decision references an income prediction. The prediction models may further reference data sources.

The decision service 250 can be configured to walk the tree, determine all the data sources required to approve a consumer and pre-fetch or not data for decisions further in the decision tree based on configuration. For example, responsive to a request for an approval decision, decision service 250 walk the tree comprising an approval decision 1210, fraud decision 1220, credit check decision 1230 and approval decision 1240, determine the data sources required for the decisions, including communicating with prediction and modeling service 260 to determine the data sources required for the prediction models referenced by the decisions, and fetch the data sources from decision service 250.

In another embodiment, decision service 250 can be configured to wait to fetch a data source until processing a decision or requesting a predication that uses the data source. For example, responsive to a request for an approval decision, decision service 250 may execute the approval decision 1210, moving to the fraud decision 1220 prior to the other sub-decisions. If an application does not pass the fraud decision 1220, decision service 250 may return the appropriate decline codes and terminate the process. In this configuration and example, the decision service will not reach the credit decision 1230 and, therefore, will not fetch the data source referenced in credit decision 1230.

In one embodiment, the decision service 250 may be configured to wait to pull certain data, due to processing or financial cost, until the consumer has otherwise passed decisions in the decision tree. For example, because final decision 1200 references the sub-decision 1210 before initiating a hard credit pull, decision service 250 can wait for decision 1210 to be fully executed before pulling hard credit data. In yet another embodiment, data may be pulled based on the amount of time it takes to pull certain types of data.

Furthermore, the data sources, models, etc. loaded at one level of the tree may be available to sub-decisions further down the tree. For example, because preapproval decision 1210 references the data source Innovis Version 1.1, this data source is implicitly available to fraud decision 1220, credit decision 1230 and affordability decision 1240. The sub-decisions may or may not reference the data sources again. By selecting the order of statements in a decision and the arrangement of decisions in a decision tree, the decision engine can be configured to wait to pull certain data, due to processing or financial cost, until the consumer passes earlier decisions.

It can be noted that approval decision 1210 does not require a hard credit pull. Instead, a hard credit pull can be performed in later processes, for example when a consumer is finalizing a transaction based on an application approved by approval decision 1210.

If a consumer application is approved through the approval process, the application may be enhanced with one or more affordability scores and credit risk scores. FIG. 4I, for example, illustrates an example of an application page displaying an affordability score for a user. Downstream processes may use the affordability score and credit risk score to filter inventory items available for purchase to the user and to approve purchases.

Figure 13:
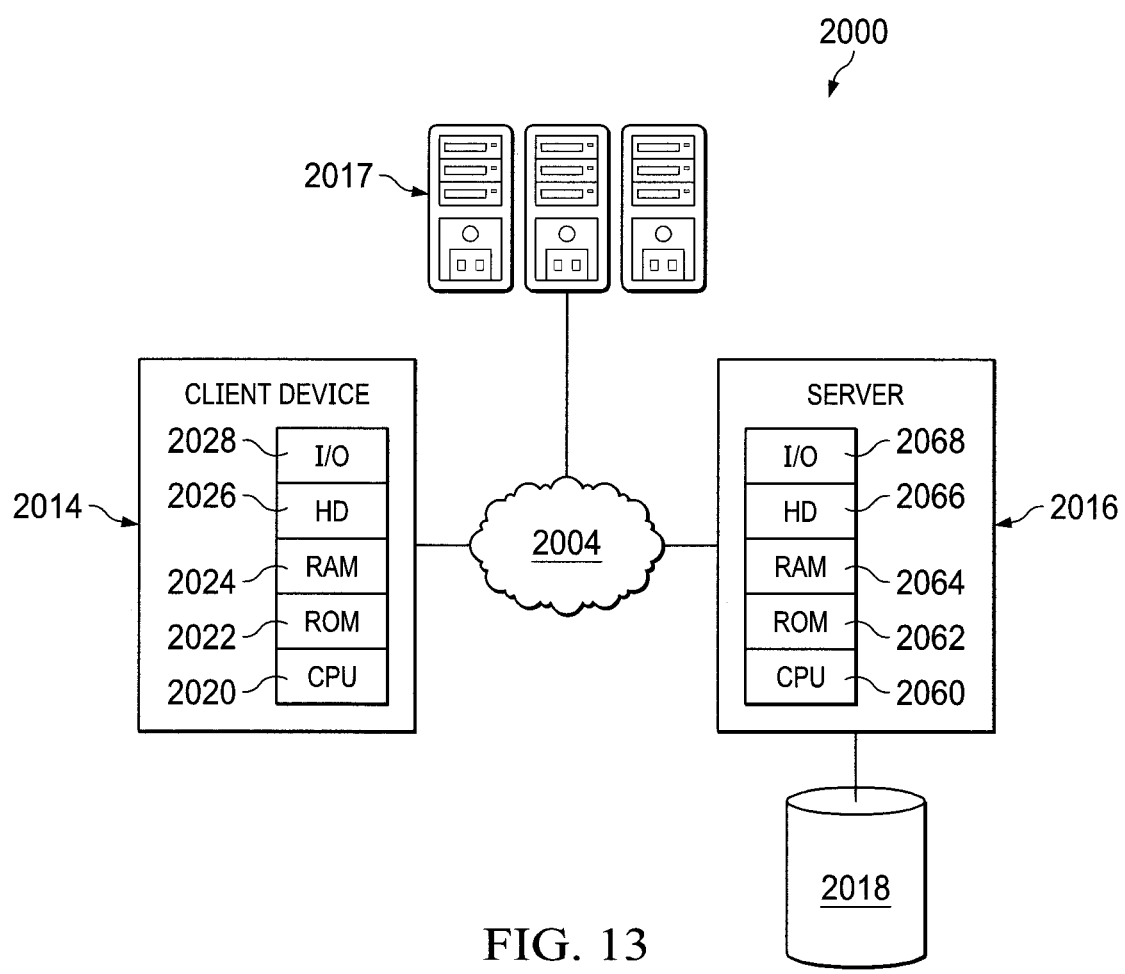
FIG. 13 depicts a diagrammatic representation of a distributed network computing environment.

FIG. 13 depicts a diagrammatic representation of a distributed network computing environment where embodiments disclosed can be implemented. In the example illustrated, network computing environment 2000 includes network 2004 that can be bi-directionally coupled to a client computing device 2014, a server system 2016 and one or more third party system 2017. Server system 2016 can be bi-directionally coupled to data store 2018. Network 2004 may represent a combination of wired and wireless networks that network computing environment 2000 may utilize for various types of network communications known to those skilled in the art.

For the purpose of illustration, a single system is shown for each of client computing device 2014 and server system 2016. However, a plurality of computers may be interconnected to each other over network 2004. For example, a plurality client computing devices 2014 and server systems 2016 may be coupled to network 2004.

Client computer device 2014 can include central processing unit ("CPU") 2020, read-only memory ("ROM") 2022, random access memory ("RAM") 2024, hard drive ("HD") or storage memory 2026, and input/output device(s) ("I/O") 2028. I/O 2028 can include a keyboard, monitor, printer, electronic pointing device (e.g., mouse, trackball, stylus, etc.), or the like. In one embodiment I/O 2028 comprises a touch screen interface and a virtual keyboard. Client computer device 2014 may implement software instructions to provide a client application configured to communicate with a data processing system. Likewise, server system 2016 may include CPU 2060, ROM 2062, RAM 2064, HD 2066, and I/O 2068. Server system 2016 may implement software instructions to implement a variety of services for a data processing system. These services may utilize data stored in data store 2018 and obtain data from third party systems 2017. Many other alternative configurations are possible and known to skilled artisans.

Each of the computers in FIG. 13 may have more than one CPU, ROM, RAM, HD, I/O, or other hardware components. For the sake of brevity, each computer is illustrated as having one of each of the hardware components, even if more than one is used. Each of computers 2014 and 2016 is an example of a data processing system. ROM 2022 and 2062; RAM 2024 and 2064; HD 2026, and 2066; and data store 2018 can include media that can be read by CPU 2020 or 2060. Therefore, these types of memories include non-transitory computer-readable storage media. These memories may be internal or external to computers 2014 or 2016.

Portions of the methods described herein may be implemented in suitable software code that may reside within ROM 2022 or 2062; RAM 2024 or 2064; or HD 2026 or 2066. The instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

Any suitable programming language can be used to implement the routines, methods or programs of embodiments of the invention described herein. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B are true (or present).

To the extent particular values are provided in any example embodiments in the description, such values are provided by way of example and not limitation. Moreover, while in some embodiments rules may use hardcoded values, in other embodiments rules may use flexible values. In one embodiment, one or more of the values may be specified in a registry, allowing the value(s) to be easily updated without changing the code. The values can be changed, for example, in response to analyzing system performance.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A computer system that provides a low friction operator interface, the computer system comprising:
    a mobile device processor;
    a mobile application executable by the mobile device processor to:
    present a graphical user interface at the mobile device, the graphical user interface comprising a series of application pages having inputs for a limited set of user record information; generate a user record;
    receive the limited set of user record information of a user via the user interface, the limited set of user record information including comprising an image of a government issued identification document;
    populate one or more fields of the user record with pieces of information included in the limited set of user record information received via the user interface;
    extract one or more pieces of personally identifiable information from the image of the government identification document;
    modify the user record to populate one or more fields of the user record with the one or more pieces of personally identifiable information extracted from the image of the government identification document, thereby creating an enhanced user record; and
    send a set of application data to a server computer for processing, the set of application data comprising an enhanced set of user record information contained in the enhanced user record;
    wherein the server computer is executable to:
    based on a request to approve a user application from the mobile application, connect to a plurality of remote information provider systems to retrieve a set of information provider data referenced by approval rules using personally identifiable information from the enhanced set of user record information;
    determine if the user application is approved based on the approval rules and the set of information provider data;
    based on a determination that the user application is not approved, send a decision response to the mobile application indicating denial of the user application; and
    based on a determination the user application is approved, send a decision response to the mobile application indicating approval of the user application.

2. The computer system of claim 1, wherein the mobile application is further executable to:
    pre-fill a plurality of editable fields in the user interface with the personally identifiable information extracted from the image and enabling confirmation of the personally identifiable information extracted from the image; and
    receive a user input based on a user interaction with the graphical user interface, the user input confirming the personally identifiable information in the editable fields;
    wherein the mobile application modifies the limited set of user record information with the personally identifiable information extracted from the image based responsive to the user input confirming the personally identifiable information in the editable fields.

3. The computer system of claim 1, wherein the mobile application further comprises an interface for a remote identification verification service and is further executable to:
    based on receiving the image of the government issued identification document, connect to the remote identification verification service and provide the image to the remote identification verification service;
    receive an identification verification signal responsive to the image from the remote identification verification service; and
    based on the identification verification signal indicating the government issued identification document is authentic, continue an application approval process to enhance the limited set of user record information.

4. The computer system of claim 1, wherein the mobile application further comprises an interface for a remote data extraction service and is further executable to:
    connect to the remote data extraction service;
    provide the image of the government issued identification document to the third party data extraction service; and
    receive the personally identifiable information extracted from the image of the government issued identification document from the data extraction service.

5. The computer system of claim 1, further comprising:
    a data store storing approval rules; and
    the server computer, the server computer comprising a server computer processor and a server data application and coupled to the data store, the server data application executable to process a user application according to the approval rules to approve or deny the user application, the user application comprising the set of application data.

6. The computer system of claim 5, wherein the server computer comprises a set of application program interfaces (APIs) specifically configured for a plurality of remote information provider systems, wherein the server data application is further executable to retrieve a set of information provider data using the APIs.

7. The computer system of claim 5, wherein the mobile application is further executable to:
    based on the decision response indicating denial of the user application, present an application page requesting additional user information and responsive to receiving the additional user information, generate a request to approve the user application, the user application comprising the additional user information; and
    based on the decision response indicating approval of the user application, present an application page indicating approval of the user application.

8. The computer system of claim 7, wherein the approval rules comprise fraud detection rules, identity verification rules, income verification rules and affordability rules.

9. The computer system of claim 5, wherein the approval rules comprise a credit check rule referencing data from a credit report from a crediting reporting service and the server data application is executable to:
connect to the credit reporting service and retrieve the credit report for the user using the enhanced set of user record information; and
determine if the application passes the credit check based on applying the credit check rule to the retrieved credit report.

10. The computer system of claim 5, wherein the approval rules comprise an identity verification rule referencing data from a remote identity verification service and the server data application is executable to:
connect to the remote identity verification service and retrieve identity verification data for the user using the enhanced set of user record information; and
determine if the application passes the identity verification rule based on applying the identity verification rule to the retrieved identity verification data.

11. The computer system of claim 5, further comprising a maximum debt-to-income ratio (DTI) and maximum payment-to-income ratio (PTI) stored in the data store, wherein the approval rules comprise an affordability rule that specifies a credit report from a credit reporting service and wherein the server data application is further executable to:
connect to the credit reporting service and retrieve a soft pull credit report for the user using personally identifiable information from the enhanced set of user record information, the credit report comprising trade lines;
analyzing the trade lines in the credit report to determine a monthly debt obligation;
determine a current DTI for the user from a user income and the monthly debt obligation;
determine an affordability score for the user, the affordability score for the user comprising a monthly payment that does not exceed the maximum PTI and when added to a specified income for the user, does not exceed the maximum DTI; and
enhance the set of application data with the affordability score.

12. The computer system of claim 11, further comprising a maximum payment limit, wherein the affordability score is limited by the maximum payment limit.

13. The computer system of claim 11, wherein the user income is a verified income.

14. The computer system of claim 13, wherein the server data application is further executable to determine the verified income using at least two different income measures selected from a projected income determined based on financial transactions in a financial account of the user, a self-reported income and an estimated income.

15. The computer system of claim 5, wherein the approval rules further comprise an income verification rule to verify a user's income, the income verification rule referencing a self-reported income collected in the limited set of user record information and an estimated income from an income estimation service, wherein the server data application is further executable to:
connect to the income estimation service and retrieve the estimated income for the user from the income estimation service using personally identifiable information from the enhanced set of user record information; and
determine a verified income from the estimated income and self-reported income based on the income verification rule.

16. The computer system of claim 1, further comprising an income prediction model stored in the data store, the income prediction model referencing an estimated income from an income estimation service and a projected income determined based on financial transactions in a financial account of the user, wherein the approval rules comprise an income verification rule that references a predicted income from the income prediction model and server data application is further executable to:
connect to the income estimation service and retrieve the estimated income for the user from the income estimation service using personally identifiable information from the enhanced set of user record information;
retrieve the projected income for the user based on financial transactions in the financial account of the user, wherein the projected income is retrieved using credentials provided by the user to the mobile application;
determine the predicted income based on the income prediction model and using the projected income and the estimated income; and
determine a verified income according to the income verification rule using the predicted income determined from the income prediction model and a self-reported income from the limited set of user record information.

17. The computer system of claim 1, further comprising an income prediction model stored in the data store, the income prediction model referencing an estimated income from an income estimation service and a projected income determined based on financial transactions in a financial account of the user, wherein the approval rules comprise an income verification rule that references a predicted income from the income prediction model, the estimated income and a self-reported income from the limited set of user record data and wherein the server data application is further executable to:
connect to the income estimation service and retrieve the estimated income for the user from the income estimation service using personally identifiable information from the enhanced set of user record information;
retrieve the projected income for the user based on financial transactions in the financial account of the user, wherein the projected income is retrieved using credentials provided by the user to the mobile application;
determine the predicted income based on the income prediction model and using the projected income and the estimated income; and
determine a verified income according to the income verification rule using the predicted income determined from the income prediction model, the self-reported income from the limited set of user record information and the estimated income.

18. A computer program product comprising a non-transitory computer readable medium comprising a set of computer instructions executable to perform a method comprising:
presenting a graphical user interface in a display of a mobile device, the graphical user interface comprising a series of application pages having inputs for a limited set of user record information;

generating a user record;

receiving the limited set of user record information via the user interface, the limited set of user record information including comprising an image of a government issued identification document;

populating one or more fields of the user record with pieces of information included in the limited set of user record information received via the user interface;

extracting one or more pieces of personally identifiable information from the image of the government identification document;

modifying the user record to populate one or more fields of the user record with the one or more pieces of personally identifiable information extracted from the image of the government identification document, thereby creating an enhanced user record; and sending a set of application data from the mobile device to a server computer for processing, the set of application data comprising an enhanced set of user record information contained in the enhanced user record;

wherein the server computer is executable to perform:

based on a request to approve a user application from the mobile application, connecting to a plurality of remote information provider systems to retrieve a set of information provider data referenced by approval rules using personally identifiable information from the enhanced set of user record information;

determining if the user application is approved based on the approval rules and the set of information provider data;

based on a determination that the user application is not approved, sending a decision response to the mobile application indicating denial of the user application; and based on a determination the user application is approved, sending a decision response to the mobile application indicating approval of the user application.

19. The computer program product of claim 18, wherein the method further comprises:

pre-filling a plurality of editable fields in the user interface with the personally identifiable information extracted from the image to allow the user to confirm the personally identifiable information extracted from the image; and receiving a user input based on a user interaction with the graphical user interface confirming the personally identifiable information in the editable fields;

wherein the enhancing the limited set of user record information with personally identifiable information extracted from the image is performed responsive to the user input confirming the personally identifiable information in the editable fields.

20. The computer program product of claim 19, wherein the method further comprises:

receiving an update to a piece of personally identifiable information displayed in an editable field from the plurality of editable fields; and enhancing the limited set of user record information with the updated piece of personally identifiable information.

21. The computer program product of claim 18, wherein the method further comprises:

based on receiving the image of the government issued identification document, connecting the mobile device to a remote identification verification service and providing the image to the remote identification verification service;

receiving an identification verification signal at the mobile device from the remote identification verification service, the identification verification signal responsive to the image; and based on the identification verification signal indicating the government issued identification document is authentic, continuing an application approval process to enhance the limited set of user record information.

22. The computer program product of claim 18, wherein the method further comprises:

connecting the mobile device to a third party data extraction service;

providing the image of the government issued identification document to the third party data extraction service; and receiving the personally identifiable information extracted from the image of the government issued identification document at the mobile device from the data extraction service.

\* \* \* \* \*